United States Patent [19]
Fromm

[11] Patent Number: 5,884,754
[45] Date of Patent: Mar. 23, 1999

[54] CONVEYOR BELT SUPPORT

[75] Inventor: Alfred Fromm, Reutlingen, Germany

[73] Assignee: bebro-electronic Bengel & Bross GmbH, Germany

[21] Appl. No.: 865,391

[22] Filed: May 29, 1997

Related U.S. Application Data

[63] Continuation of PCT/EP95/04703, Nov. 29, 1995.

[30] Foreign Application Priority Data

Nov. 29, 1994 [DE] Germany ............................ 44 42 464.7
Aug. 28, 1995 [DE] Germany ........................ 195 31 580.4

[51] Int. Cl.$^6$ ................................................. B65G 39/16
[52] U.S. Cl. ......................... 198/807; 198/806; 198/808; 198/810.03
[58] Field of Search .................................. 198/806, 807, 198/808, 810.03

[56] References Cited

U.S. PATENT DOCUMENTS

| | | | |
|---|---|---|---|
| 2,569,419 | 9/1951 | Kendall | 198/808 |
| 2,570,364 | 11/1951 | Mercier | 198/808 |
| 2,609,084 | 9/1952 | Hershey | 198/808 |
| 2,869,712 | 1/1959 | Kindig . | |
| 3,301,384 | 1/1967 | Sowards | 198/808 |
| 3,603,451 | 9/1971 | Promin et al. | 198/807 |
| 3,693,781 | 9/1972 | Homeier . | |

FOREIGN PATENT DOCUMENTS

| | | |
|---|---|---|
| 416367 | 10/1934 | United Kingdom . |
| 623329 | 6/1947 | United Kingdom . |
| 618850 | 3/1949 | United Kingdom . |

*Primary Examiner*—William E. Terrell
*Assistant Examiner*—Mark Deuble
*Attorney, Agent, or Firm*—Barry R. Lipsitz

[57] ABSTRACT

A conveyor belt support maintains a conveyor belt in a central position. Support rollers for the conveyor belt are provided. Additionally, an underside, edge portion of the conveyor belt acts on at least one conical alignment roller that extends transversely to a longitudinal direction of the conveyor belt, and acts to hold the conveyor belt in the central position. The rollers are supported by a rotary frame that is pivotable relative to a stationary base frame when the conveyor belt shifts sideways out of the central position. A hydraulic drive is provided for pivoting the rotary frame when the conveyor belt shift sideways. Two hydraulic pumps are provided, each driven by one of the alignment rollers to provide a pressurized hydraulic fluid to the hydraulic drive via a two-pressure valve. One of the pumps is driven with a rotational speed that depends on the amount of shifting of the conveyor belt. The fluid with the greater of the two pressures is provided to the hydraulic drive to cause the conveyor belt to pivot the rotary frame, thereby shifting the belt back toward the central position.

39 Claims, 17 Drawing Sheets

CONVEYOR BELT SUPPORT

This application is a continuation of International PCT Application No. PCT/EP95/04703 filed on Nov. 29, 1995.

BACKGROUND OF THE INVENTION

The invention relates to a conveyor belt support for belt conveyors, comprising a frame, at least one support roller for a conveyor belt of the belt conveyor, this support roller being arranged on the frame and extending with its roller axis transversely to a longitudinal direction of the conveyor belt, and the conveyor belt resting on this roller with an underside.

In the case of the known belt conveyors, the conveyor belt supports are arranged to follow one another in spaced relation in order to guide the conveyor belt, on which any type of goods can be transported, by means of the stationary support roller and to support it on its underside.

In the case of such belt conveyors the problem exists that the conveyor belt shifts or drifts many times, for example due to uneven loading, out of its central position, in which it is arranged symmetrically to the at least one support roller, and thus has the tendency to shift sideways over the support roller or to butt laterally, for example, on the conveyor belt support and thus cause a disruption of the belt conveyor.

The object underlying the invention is therefore to provide a conveyor belt support for belt conveyors which is in a position to correct a lateral shifting of the conveyor belt out of the central position.

SUMMARY OF THE INVENTION

This object is accomplished in accordance with the invention, in a conveyor belt support of the type described at the outset, in that the frame comprises a base frame and a rotary frame pivotable about an axis of rotation in relation to the base frame, that the rotary frame supports the support roller, that alignment rollers are provided in addition to the support rollers for holding the conveyor belt in a central position of the belt conveyor, that the alignment rollers are arranged such that the conveyor belt running on the support roller acts on at least one of the alignment rollers when shifting sideways out of the central position and thereby pivots the rotary frame with the support roller into a rotary position, in which the support roller guides the conveyor belt in the direction of its central position.

The invention is thus to be seen in the fact that as a result of the alignment roller a pivoting movement of the rotary frame is brought about and that due to this pivoting movement of the rotary frame the support roller acts on the conveyor belt in such a manner that this is guided back into its central position. Therefore, an inventive conveyor belt support creates the possibility of guiding a conveyor belt shifting out of the central position back into the central position again, wherein the conveyor belt can continue to run and no interference of the conveying performance of the belt conveyor results.

In this respect, the fact that an inventive conveyor belt support guides the conveyor belt back automatically into the central position, merely by pivoting the rotary frame, and thus makes actions from outside unnecessary is particularly advantageous.

A particular advantage of the inventive conveyor belt support is the fact that it is possible to arrange this between conventional conveyor belt supports with likewise at least one rigidly aligned support roller each since the displacement of the conveyor belt as a result of the inventive conveyor belt support has an effect over large distances of the conveyor belt.

The type of alignment roller has not so far been specified. In principle, it is possible to provide as alignment rollers rollers having a cylinder casing, wherein the respective alignment roller can be driven when the conveyor belt acts on it.

It is, however, particularly advantageous when the alignment rollers have a rotationally symmetric outer casing with a diameter varying in an axial direction. An alignment roller designed in this way creates the possibility of detecting via the rotational speed of the alignment roller which region of the rotationally symmetric outer casing is driven by the conveyor belt, in particular a side edge thereof, since, as a result of the allocation of different diameters to different regions of the outer casing, any driving of the alignment roller in these different regions leads to different rotational speeds of the alignment roller.

A contour of the outer casing which is, geometrically, particularly simple and suitable provides for the outer casing to be a cone-shaped casing. With such a cone-shaped casing, different regions of the outer casing are clearly associated with different diameters and so it can be clearly detected via the rotational speed, in which region of the outer casing the alignment roller is driven.

With respect to the control response during the pivoting movement of the inventive rotary frame, it has proven to be particularly favorable when the alignment rollers are arranged such that the areas of the outer casing corresponding to the smallest diameter face one another and the areas of the outer casing with the greatest diameter are preferably located remote from one another.

The alignment rollers can, in principle, be arranged such that their axes of rotation extend parallel to one another or at optional angles.

It is particularly advantageous when the alignment rollers are arranged such that their outer casings, when seen transversely to the direction of conveyance, project beyond a contact surface for the conveyor belt, which is defined by the support roller, upwards in the direction of the conveyor belt on both sides of the conveyor belt running in a central position. This means that it is possible in a simple manner for the alignment rollers to be driven by the conveyor belt when this shifts out of the central position.

This may be realized particularly simply when the alignment rollers are arranged with their axes of rotation in a V shape in relation to one another.

In relation to the contact surface for the conveyor belt which is defined by the support rollers, this alignment of the alignment rollers may be defined particularly advantageously when the alignment rollers form a smaller angle between them with their axes of rotation than lateral regions of the contact surface defined by the support roller, on which the conveyor belt rests in a central position.

With respect to the arrangement of the alignment rollers relative to the support roller or rollers, no details have likewise been given thus far.

In an advantageous, inventive solution it is provided for the alignment rollers to be located with their axes of rotation in one plane together with the roller axis of the support roller. This solution has the advantage that the alignment rollers are pivotable in the same way as the support roller and, in addition, the advantage that the running direction of the conveyor belt can be reversed without influencing the functioning of the inventive solution provided that the pivoting movement of the support roller triggered by the alignment rollers always takes place such that the support roller guides the conveyor belt back in the direction of its central position.

The alignment rollers are thereby advantageously arranged on both sides of the support roller or the support rollers.

The alignment rollers could, for example, be arranged coaxially to the support roller or to the support rollers, wherein the alignment rollers in this case, in particular, adjoin the support roller or the support rollers on both sides of the conveyor belt located in a central position.

Alternatively thereto, it is provided for the axes of rotation of the alignment rollers to be arranged in a plane which is arranged at a distance to the plane of the roller axis or the roller axes of the support roller.

When seen in the direction of conveyance, this would be possible in front of or behind the alignment rollers. The rotation of the rotary frame provided in accordance with the invention can be initiated particularly advantageously when the alignment rollers, when seen in the direction of conveyance, are arranged in front of the support roller so that the conveyor belt first passes the alignment rollers and then the support roller or the support rollers during its movement in the direction of conveyance.

Furthermore, it would, for example, be conceivable to arrange the alignment rollers to be rigid relative to the base frame or rotary frame.

However, a particularly advantageous embodiment results when the alignment rollers are arranged to be movable transversely to the direction of conveyance towards or away from the conveyor belt in order to have available, in addition, a further parameter, with which the control response generated by the action of the conveyor belt on the alignment rollers can be influenced.

An advantageous example provides, for example, for a movement of the alignment roller, which is driven during the shifting of the conveyor belt out of the central position, to take place transversely to the direction of conveyance in the direction away from the conveyor belt with the pivoting of the rotary frame into a pivot position guiding the conveyor belt back into the central position, i.e. the driven alignment roller likewise moves transversely to the direction of conveyance during the rotary movement of the rotary frame.

This means that any undesired overrunning of the alignment roller by the conveyor belt transversely to the direction of conveyance can be prevented. In addition, the transverse movement creates the possibility of influencing the control characteristics of the alignment roller in a positive manner since the size of the transverse movement of the alignment roller can be predetermined by a particular choice of the constructional parameters. It is particularly advantageous when the transverse movement of the alignment roller driven during the shifting outwards takes place in the direction away from the conveyor belt for such a time until the rotary frame has reached a maximum pivot position.

A particularly favorable control characteristic may be achieved when in the maximum pivot position of the rotary frame the alignment roller driven first of all during the shifting outwards is no longer acted upon by the conveyor belt and thus a pivoting movement of the rotary frame beyond the maximum pivot position can be limited in a simple manner by the movement of the driven alignment roller transversely to the direction of conveyance.

Furthermore, it has proven to be advantageous when, with the pivoting of the rotary frame into a pivot position guiding the conveyor belt back into the central position, a movement of the alignment roller located opposite the side where the conveyor belt shifts out of the central position takes place transversely to the direction of conveyance in the direction towards the conveyor belt. This means that this alignment roller which is not driven at first can track the conveyor belt.

It is then possible, in particular, for the alignment roller located opposite the side of the shifting out of the central position to be movable in the maximum pivot position to such an extent transversely to the direction of conveyance that this is driven by the conveyor belt in the maximum pivot position of the rotary frame in order to thereby initiate a slow pivoting back of the rotary frame into the normal position.

In order to pivot the rotary frame back into the normal position, it is preferably provided for the alignment roller located opposite the side of the shifting out of the central position to be driven during the pivoting of the rotary frame back into the normal position for such a time until the rotary frame has reached the normal position.

In the simplest case, it is provided that in the normal position of the rotary frame and central position of the conveyor belt this does not drive either of the alignment rollers and so one of the two alignment rollers is not driven on the side of the shifting outwards until after the conveyor belt shifts out of the central position.

The movements of the alignment rollers transversely to the direction of conveyance can preferably be brought about in a particularly simple manner when the alignment rollers are movable transversely to the direction of conveyance controlled by the pivoting movement of the rotary frame and so no specially controlled tracking of the aligning rollers relative to the movement of the conveyor belt takes place but the control of the movement of the alignment rollers is controlled directly via the pivoting movement of the rotary frame since this pivoting movement is, in the end, responsible for the conveyor belt being guided back again into the normal position.

For reasons of simplicity is, in addition, advantageously provided for the two alignment rollers to be movable together transversely to the direction of conveyance so that a separate control is not required for the movement of each of the alignment rollers.

In the simplest case, the movement of the alignment rollers transversely to the direction of conveyance can be brought about by the two alignment rollers being arranged on the rotary frame and thus being pivotable together with the rotary frame relative to the conveyor belt.

The movement of the alignment rollers transversely to the direction of conveyance may be achieved particularly simply in combination with the pivoting movement of the rotary frame when the alignment rollers are located with their axes of rotation in a plane which is arranged at a distance from the axis of rotation, wherein the plane preferably extends parallel to the axis of rotation in order to avoid any transverse slip during driving of the alignment rollers.

No further details have so far been given concerning the way in which a rotation of the rotary frame is brought about via the alignment rollers; an advantageous embodiment provides for an electric signal to be generatable with each alignment roller, dependent on its rotational speed, and for a pivoting of the rotary frame in relation to the base frame to be brought about via an adjusting motor in accordance with the signals generated by the alignment rollers.

The advantage of this solution is to be seen in the fact that the regulating characteristics during the pivoting of the rotary frame can be influenced in an advantageous manner via the generation of the electric signal and the activation of the adjusting motor dependent thereon. In addition, it is also possible, in particular, to select the running direction of the conveyor belt as desired and also regulate in accordance with the running direction.

In the simplest case, this solution provides for each alignment roller to drive a generator which generates a supply current for the adjusting motor turning the rotary frame so that the supply current directly represents the electric signal generated by the respective alignment roller.

This solution has the great advantage that the rotary frame need not be supplied with a supply current for the adjusting motor separately but that each alignment roller automatically generates the supply current for the adjusting motor as a result of the driving of the generator associated with it and so the inventive conveyor belt support does not require any separate supply of current although it is possible to influence the regulating characteristics in a simple manner by way of additionally preconnected circuits acting on the supply current.

Alternatively hereto, it is provided for each alignment roller to drive a sensor which supplies a signal dependent on rotational speed for a control means which, for its part, controls the supply current for the adjusting motor. Such a control means offers the advantage that a linking of the signal corresponding to the rotational speed with the supply current for the adjusting motor can be varied in any optional manner, for example in accordance with a family of characteristics, and thus the regulating characteristics can be predetermined in a simple manner and varied for different uses.

All the solutions operating with an electric signal have, in addition, the advantage that a reversal of the direction of rotation and thus a reversal of the direction of rotation of the drive for the generator or signal generator likewise causes no problems in the case of the activation of the adjusting motor and so these solutions are also suitable for a reversal of the running direction of the conveyor belt.

Alternatively to an electrically controlled drive for the pivoting of the rotary frame, an additional solution provides for a mechanical gearing to be provided for the pivoting of the rotary frame in relation to the base frame and for the mechanical gearing to be drivable, for its part, mechanically via the alignment rollers. A mechanical gearing of this type has the advantage that no electrical components are required and in certain cases of use, such as, for example, surroundings endangered by explosions, in which electrical components could cause problems, a simple pivoting of the rotary frame is possible, automatically controlled by the alignment rollers via the mechanical gearing as well as the drive thereof. As for the rest, the mechanical gearing is in a position to regulate in accordance with the respective running direction.

The mechanical gearing is thereby preferably constructed such that the two alignment rollers drive a common gear wheel via respective gear wheels, a drive of the rotary frame for its pivoting relative to the base frame being brought about via this common gear wheel.

However, a reduction is preferably provided between the gear wheel of the gearing commonly driven via the alignment rollers, via which the gearing then drives the rotary movement of the rotary frame in relation to the base frame.

In the case where a mechanical gearing is used, the same function can also be achieved when the running direction of the conveyor belt is reversed since the mechanical gearing also operates in the same way when the direction of rotation is reversed and thus when the alignment rollers are driven in reverse direction.

An additional, advantageous solution of the drive for the pivoting of the rotary frame relative to the base frame, as an alternative to the preceding solutions, provides for the two alignment rollers to drive hydraulic pumps of a hydraulic system which comprises a hydraulic drive pivoting the rotary frame in relation to the base frame.

The use of a hydraulic system has the great advantage that, in particular, in surroundings at risk of explosions no electric lines and electric contacts whatsoever are required.

Furthermore, the use of a hydraulic system has the great advantage that each inventive conveyor belt support can operate self-sufficiently without any separate energy supply of its own, wherein the realization of a hydraulic system represents a particularly reliable solution operating in rough ambient conditions.

In order to design such a concept so that the running direction of the conveyor belt can also be reversed, it is advantageously provided for the hydraulic pumps to be functional during driving in two directions of rotation opposite to one another, i.e. the hydraulic pumps convey hydraulic medium in reverse direction, for example, when the direction of rotation is reversed.

With respect to the detailed design of the hydraulic system, no further details have so far been given. One particularly advantageous embodiment provides for the hydraulic system to comprise a pilot controlled double check valve connected to the input to the hydraulic drive. In particular with a design of the hydraulic drive as a hydraulic cylinder, such a check valve allows the hydraulic cylinder, when a pressure is not exerted, i.e. the alignment rollers are not driven, to be held in the position, in which it was beforehand, so that when the alignment rollers are not driven the rotary frame cannot be freely moved in relation to the base frame but is held in a stable position by the hydraulic drive held in its position by the pilot controlled double check valve for such a time until the conveyor belt drives one of the alignment rollers and a pressure is thereby generated again in the hydraulic system.

An additional, advantageous solution provides for the hydraulic system to comprise a two-pressure valve located between two pressure lines leading to the hydraulic drive, this two-pressure valve connecting the pressure line with the lower pressure to a hydraulic tank via a return line and thus always enabling only one of the two pressure lines to generate a pressure acting in the long run on the hydraulic drive. This means that it is always clearly predetermined that only one of the two pressure lines can act on the hydraulic drive and thus move this in only one direction.

In a further, advantageous variation, it is preferably provided for the rotary frame to be freely rotatable in relation to the base frame and for the rotary frame to be pivotable on account of the pressure on one of the alignment rollers generated by the conveyor belt shifting sideways out of the central position, wherein, in this case, the alignment rollers are preferably arranged such that they move together coupled to the rotary frame so that the force acting on the alignment rollers transversely to the direction of conveyance due to the conveyor belt also acts on the rotary frame and pivots this into a position guiding the conveyor belt back into the central position.

In this respect, it is preferably provided for the alignment rollers to be located with their axes of rotation in a plane which is arranged at a distance from the axis of rotation.

In conjunction with the preceding explanations concerning the individual embodiments, no details have been given as to how the support roller or the support rollers are designed.

Preferably, it is not just one support roller which is provided but at least two support rollers which are arranged in a V shape relative to one another, between which the conveyor belt runs and on which the conveyor belt rests. A solution is preferred, in which a central support roller extending essentially horizontally and two support rollers arranged in a V shape relative to one another laterally of the central support roller are provided.

In addition, the invention relates to a belt conveyor, comprising conveyor belt supports arranged one after the other in longitudinal direction of a conveyor belt with a base frame and support rollers having roller axes arranged rigidly in relation to the base frame, wherein, in accordance with the invention, a conveyor belt support according to the embodiments described above is provided after approximately five to approximately fifty such conveyor belt supports.

It is particularly advantageous when such a conveyor belt support described above is arranged after approximately ten to approximately thirty conventional conveyor belt supports with roller axes arranged rigidly on the base frame.

Additional features and advantages of the invention are the subject matter of the following description as well as the drawings of several embodiments. dr

DETAILED DESCRIPTION OF THE INVENTION

Figure 1:
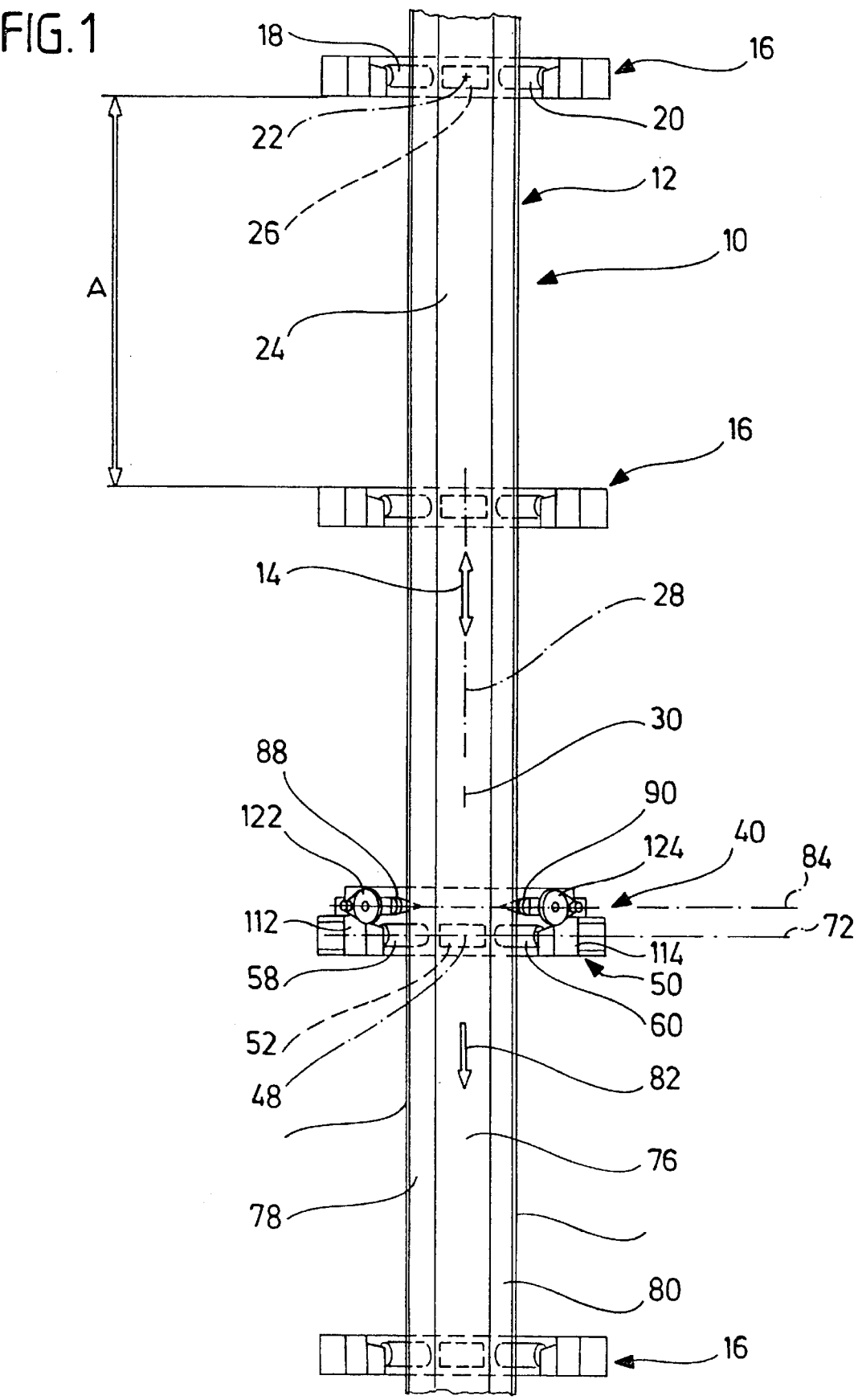
FIG. 1 shows a plan view of an inventive belt conveyor.

One embodiment of an inventive belt conveyor, designated in FIG. 1 as a whole as 10, comprises a conveyor belt 12 which is driven by drive rollers which are not illustrated and rests on conveyor belt supports 16 arranged at, for example, regular intervals A in longitudinal direction 14 of the conveyor belt and is supported by them. Each of these conveyor belt supports comprises two support rollers 18 and 20 which are arranged in a V shape relative to one another, are arranged symmetrically to an axis of symmetry 22 and form the same angle with this, wherein the axis of symmetry 22 is located essentially vertically on a conveyor surface 24, in which the conveyor belt 12 extends. In addition, the conveyor belt 12 is supported in the center by a central support roller 26 which extends parallel to the conveyor surface and on both sides of a plane of symmetry 28 which, for its part, extends in the longitudinal direction 14 of the conveyor belt 12 and intersects the axis of symmetry 22 of the respective conveyor belt support 16.

In the ideal case, the conveyor belt 12 runs in a central position in relation to the conveyor belt supports 16, i.e. the plane of symmetry 28 defined by the conveyor belt supports 16 intersects a longitudinal center of the conveyor belt 12.

When the conveyor belt 12 is loaded unevenly this can shift out of the central position so that the longitudinal center 30 thereof is located next to the plane of symmetry 28 defined by the conveyor belt supports 16.

In order to correct such a shifting sideways of the conveyor belt 12 again, an inventive conveyor belt support 40 is used instead of one of the conveyor belt supports 16, wherein an inventive conveyor belt support of this type replaces a conventional conveyor belt support 16 at regular intervals amounting to an integral multiple of the distance A.

Figure 2:
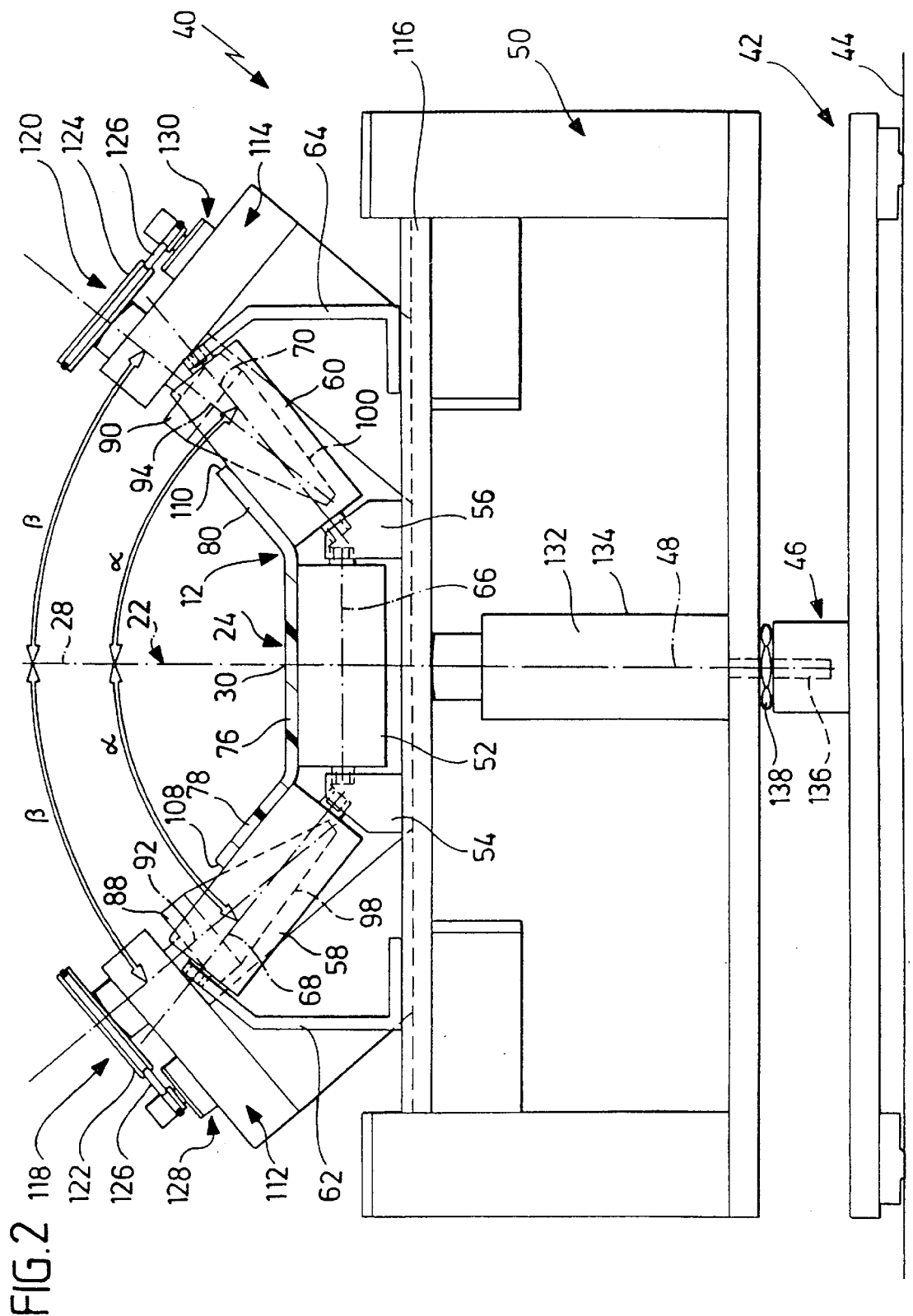
FIG. 2 shows a section along line 2—2 in FIG. 1.

An inventive conveyor belt support 40 of this type, illustrated in FIG. 2, comprises a base frame 42 which can be placed on a ground surface 44.

A rotary frame designated as a whole as 50 is mounted on the base frame 42 via a pivot bearing 46 so as to be pivotable about an axis of rotation 48, wherein the axis of rotation 48 coincides with the axis of symmetry 22 of a conventional conveyor belt support.

As in the case of one of the conveyor belt supports 16, a central support roller 52 is mounted on the rotary frame 50 between two bearing blocks 54 and 56 and support rollers 58 and 60 are arranged in a V shape relative to one another on both sides of the central support roller, wherein the support roller 58 is mounted by an outer bracket 62 and the bearing block 54 and the support roller 60 by an outer bracket 64 and the bearing block 56.

As in the case of the conveyor belt supports 16, the central support roller 52 is mounted for rotation about a roller axis 66 extending at right angles to the axis of rotation 48, preferably parallel to the conveyor surface 24, and the support rollers 58 and 60 are mounted for rotation about roller axes 68 and 70 which form with the axis of rotation 48 the same angle α as the corresponding roller axes of the support rollers 18 and 20 with the axis of symmetry 22 in the case of the conveyor belt supports 16.

The roller axes 66, 68 and 70 are preferably located in a common plane 72 which intersects the axis of rotation 48 and thus also the axis of symmetry 22 but is pivotable about the axis of rotation 48 by pivoting the rotary frame 50 which bears the support rollers 52, 58 and 60.

Figure 3:
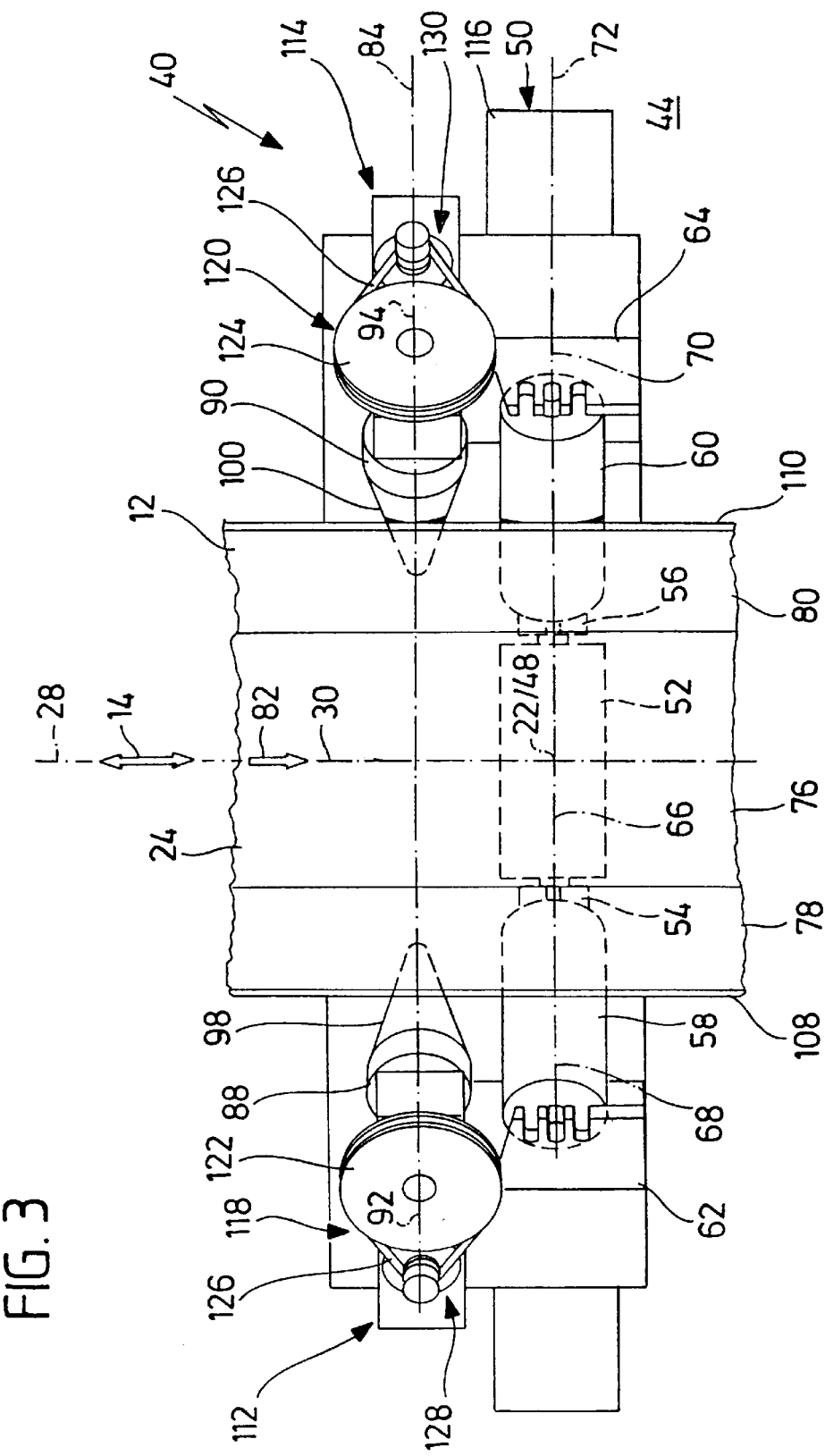
FIG. 3 shows an enlarged plan view of an inventive conveyor belt support in a normal position.

In a central position of the conveyor belt 12, the longitudinal center 30 thereof also extends through the axis of rotation 48 and thus the axis of symmetry 22, as illustrated in FIGS. 2 and 3. The conveyor belt 12 therefore rests with a central region 76 on the central support roller 52 and with lateral regions 78 and 80 arranged on both sides of the central region on the support rollers 58 and 60, respectively, wherein the lateral regions 78 and 80 are symmetrical to the axis of rotation 48 and extend symmetrically thereto.

Opposite the plane 72, namely offset contrary to a direction of conveyance 82 of the conveyor belt 12 or running direction thereof, alignment rollers 88 and 90 are arranged in a plane 84 preferably parallel to the plane 72 so as to be rotatable about respective axes of rotation 92 and 94, wherein the axes of rotation 92 and 94 form with the plane of symmetry 28 extending in longitudinal direction 14 and through the axis of rotation 48 an angle β which is smaller than the angle α.

The alignment rollers 88 and 90 have, as illustrated in FIGS. 2 and 3, a pointed cone-shaped cylinder surface 98 and 100, respectively, as outer casing, wherein the respective axis of rotation 92 or 94 represents the cone axis and a diameter of the cylinder surface 98 increases in size with increasing distance from the plane of symmetry 28 so that the cylinder surfaces 98 and 100 taper in the direction of the plane of symmetry 28.

The alignment rollers 88 and 90 are thereby arranged such that the conveyor belt 12 in its central position does not touch the cylinder surfaces 98 and 100 with its side edges 108 and 100, respectively, for as long as the rotary frame, as illustrated in FIG. 3, is in its normal position, in which the plane 72 extends at right angles to the plane of symmetry 28 and at right angles to the direction of conveyance 82. The cylinder surfaces 98 and 100 do, however, project on both sides of the conveyor belt 12 upwards beyond a contact surface predetermined by the support rollers 52, 58, 60, wherein a longitudinal center of the cylinder surfaces 98, 100 is located approximately at the level of the side edges 108, 110 of the conveyor belt 12.

The alignment rollers 88 and 90 are, in addition, as illustrated in FIGS. 2 and 3, preferably held on bearing supports 112 and 114 and mounted for rotation about the axes of rotation 92 and 94, wherein the bearing supports 112 and 114 are, for their part, seated on a base support 116 of the rotary frame 50, on which the bearing blocks 54 and 56 as well as the brackets 62 and 64, on which the support rollers 52, 58 and 60 are mounted, are likewise seated.

The bearing supports 112 and 114 thereby support the alignment rollers 88 and 90 preferably on a side remote from the conveyor belt 12.

In the embodiment illustrated in FIGS. 1 to 3, the alignment rollers 88 and 90 are not freely rotatable but each drive a generator 128 and 130, respectively, via a gearing designated as a whole as 118 and 120, respectively, and comprising, for example, belt pulleys 122 and 124 as well as a driving belt 126. The generators 128 and 130 each generate current and with this current an adjusting motor 132, likewise arranged on the rotary frame 50, namely, for example, beneath the base support 116, can be driven. This adjusting motor 132 is rigidly connected to the rotary frame 50 with a housing 134 and with a motor shaft 136 rigidly to the base frame 42 so that a rotation of the rotary frame 50 relative to the base frame 42 can be brought about with the adjusting motor 132. In this respect, the motor shaft 136 preferably passes through an axial bearing 138 supporting the rotary frame while the motor shaft 136 rotatably mounted in the housing 134 forms the radial bearing for the pivot bearing 46.

The generators 128 and 130 are connected to the adjusting motor 132 in such a manner that a drive of the respective generator 128 and 130 via the respective alignment roller 88 and 90, driven via the respective alignment roller 88 and 90 driven by the conveyor belt moving in the direction of conveyance 82, turns the adjusting motor 132 in different directions and thus also the rotary frame 50 in different directions, as will be described in detail in the following.

Such a drive of the alignment rollers 88 and 90 is not brought about in the simplest case with a rotary frame 50 located in the normal position and a conveyor belt 12 running in the central position since, with such a running of the conveyor belt 12, the side edges 108 and 110 do not abut on the cylinder surfaces 98 and 100, respectively, of the alignment rollers 88 and 90, respectively, and thus drive these.

Figure 4:
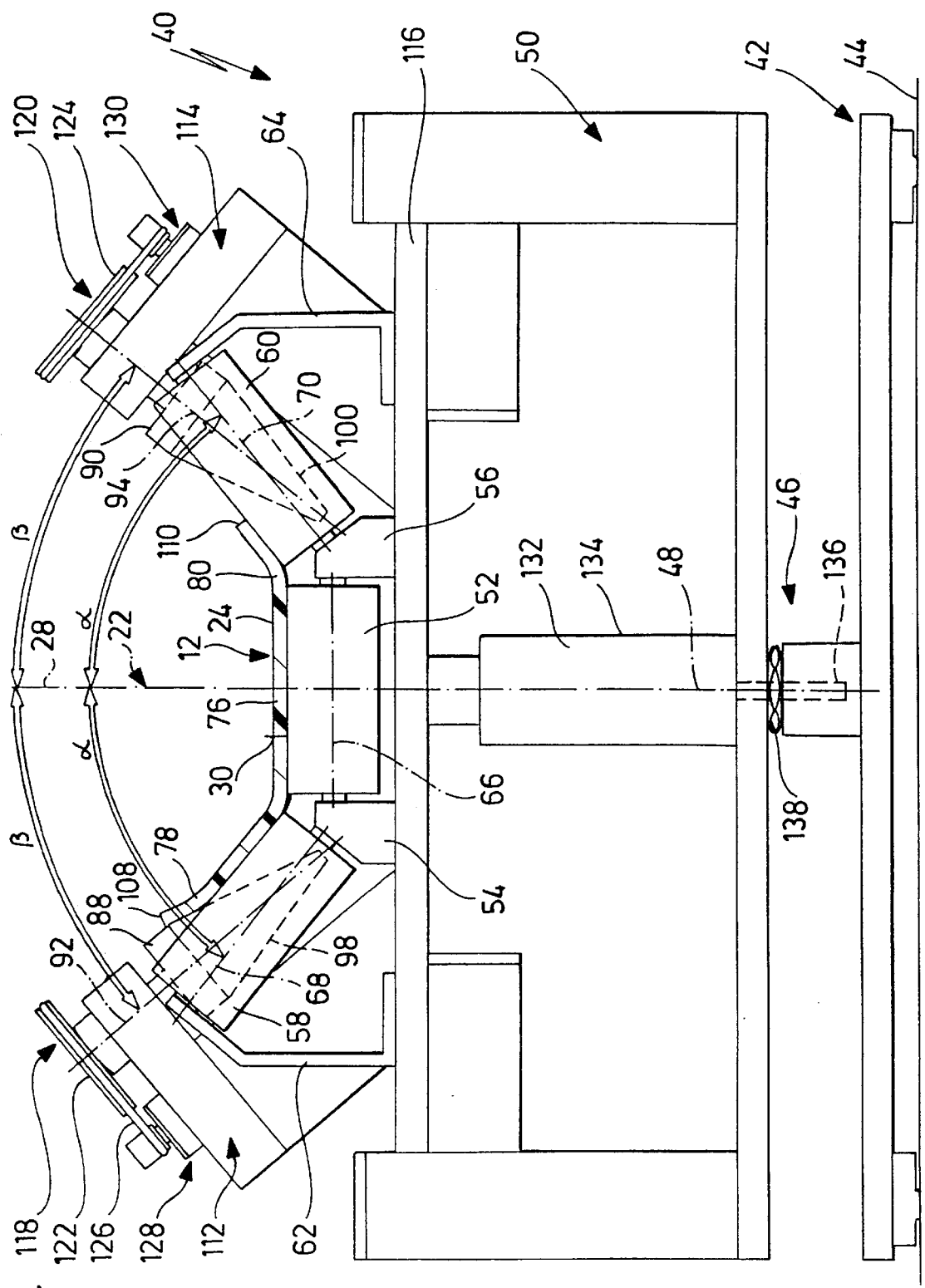
FIG. 4 shows a view similar to FIG. 2 with a conveyor belt shifting sideways.
Figure 5:
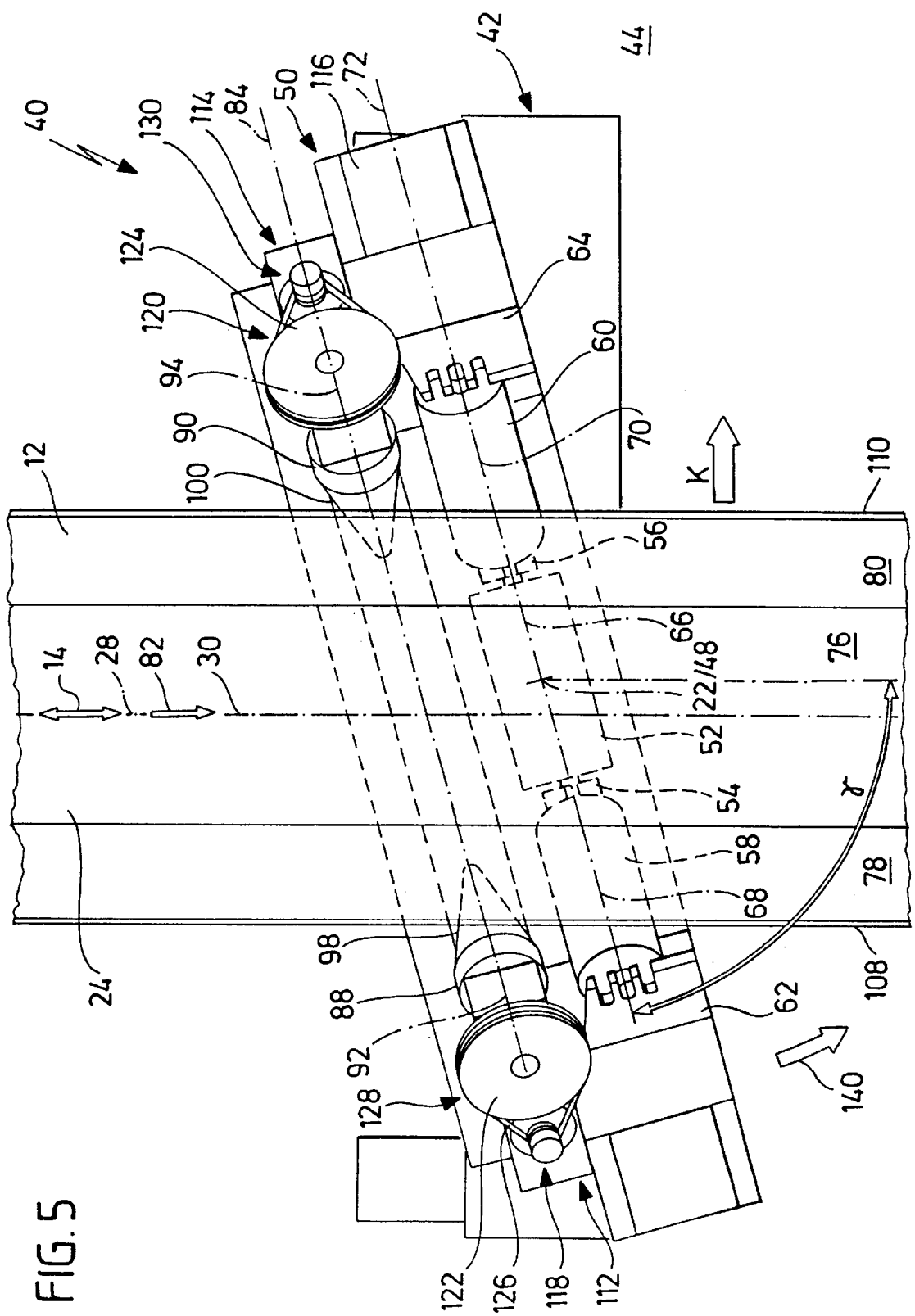
FIG. 5 shows a plan view of an inventive conveyor belt support similar to FIG. 3 in a pivot position, namely during movement in the direction of the maximum pivot position.

The alignment rollers 88 and 90 are driven, for example the alignment roller 88, when, as illustrated in FIG. 4, the conveyor belt 12 shifts out of the central position so that the longitudinal center 30 of the conveyor belt 12 is displaced in the direction of the alignment roller 88. In this case, the conveyor belt 12 comes to rest with the side edge 108 and an adjoining part of the lateral region 78 on the cylinder surface 98 of the alignment roller 88—insofar as the rotary frame 50 is in a normal position—and drives the alignment roller 88. This means that the generator 128 is driven via the gearing 118 and generates a current which feeds the adjusting motor 132 so that this initiates a slow rotation of the rotary frame 50 about the axis of rotation 48 in the direction of arrow 140, and namely, as illustrated in FIG. 5, such that the plane 72, in which the roller axes 66, 68 and 70 are located, no longer extends at right angles to the plane of symmetry 28 but forms with this such an angle that the support rollers 52, 58 and 60 act on the conveyor belt on account of the inclined position of their roller axes 66, 68 and 70 with a force K which displaces the conveyor belt 12 contrary to the direction, in which this has shifted out of the central position, so that the longitudinal center 30 is pushed successively back again in the direction of the central position due to the conveyor belt running at an angle over the support rollers 52, 58 and 60.

The angle γ between the plane 72 and the plane of symmetry 28 decreases while the alignment roller 88 is being driven and the conveyor belt 12 therefore rests with the side edge 108 on a region of greater diameter of the conical cylinder surface 98 so that the alignment roller 88 turns slowly, the generator is driven more slowly and thus causes a slower rotation of the rotary frame 50 by means of the adjusting motor 132, as well.

The rotation of the rotary frame 50 and the decrease in the angle γ between the plane 72 and the plane of symmetry 28 are thereby brought about for such a time until the alignment roller 88 is no longer driven by the side edge 108 of the conveyor belt 12, wherein on account of the rotational axes 92 and 94 of the alignment rollers 88 and 90, which are located in the plane 84 offset in relation to the plane 72 contrary to the direction of conveyance 82, the pivoting movement of the rotary frame 50 causes the alignment roller 88 to move away from the plane of symmetry 28 and thereby keep out of the way of the conveyor belt 12 shifting sideways out of the central position.

Due to the fact that the rotation of the rotary frame 50 and thus of the plane 72, in which the roller axes 66, 68 and 70 are located, already counteracts the lateral shifting of the conveyor belt 12 and, at the same time, the alignment roller 88 keeps out of the way of the conveyor belt shifting sideways on account of the rotation, a maximum rotary position is reached, in which the conveyor belt 12 no longer shifts further sideways out of the central position, and the alignment roller 88 has, however, kept out of the way of the conveyor belt 12 to such an extent that it is no longer driven by its side edge 108 and so the maximum pivot position of the rotary frame 50 and thus of the plane 72 is reached.

Figure 6:
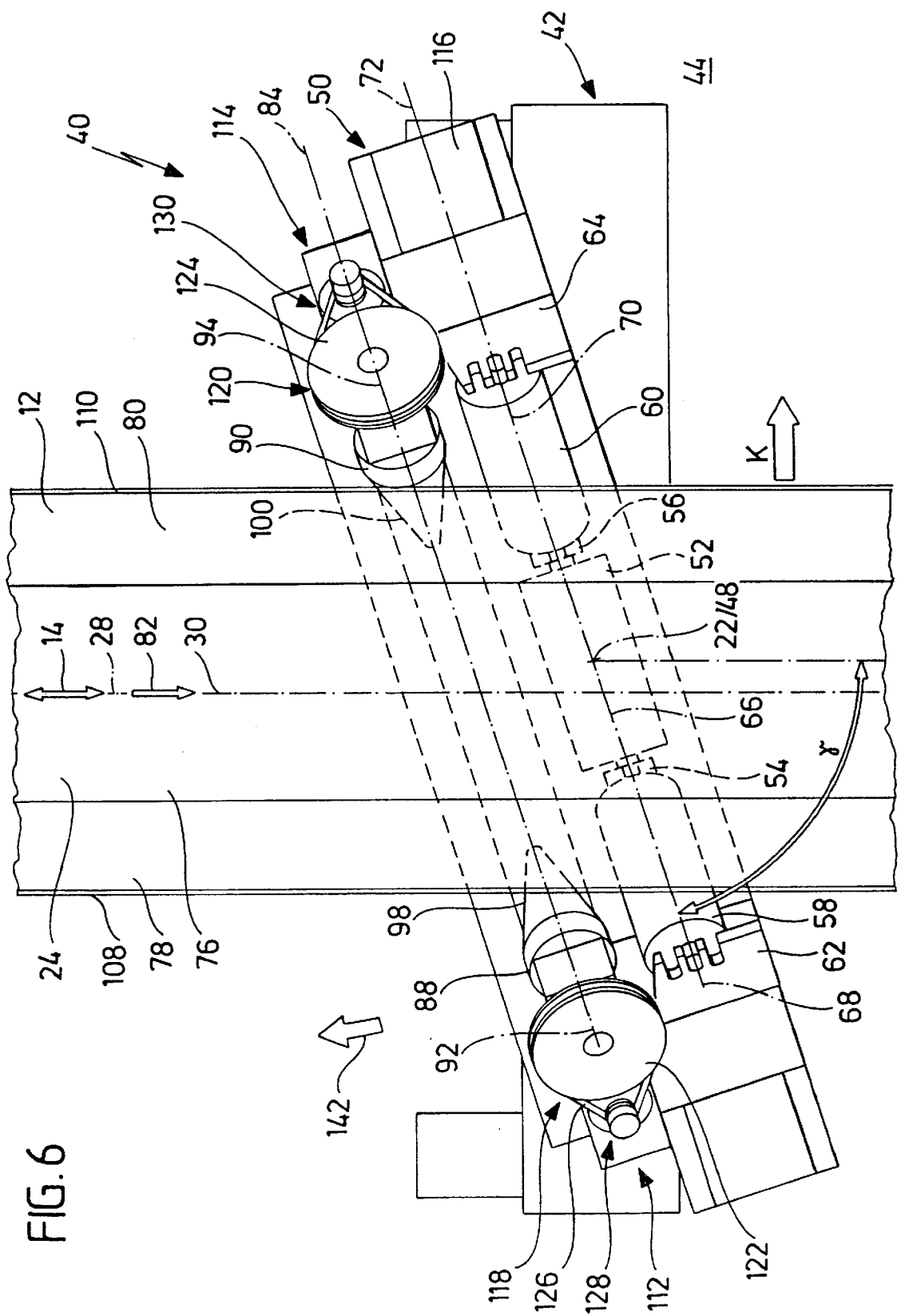
FIG. 6 shows a plan view similar to FIG. 5, namely in a pivot position during pivoting back in the direction of the normal position.
Figure 7:
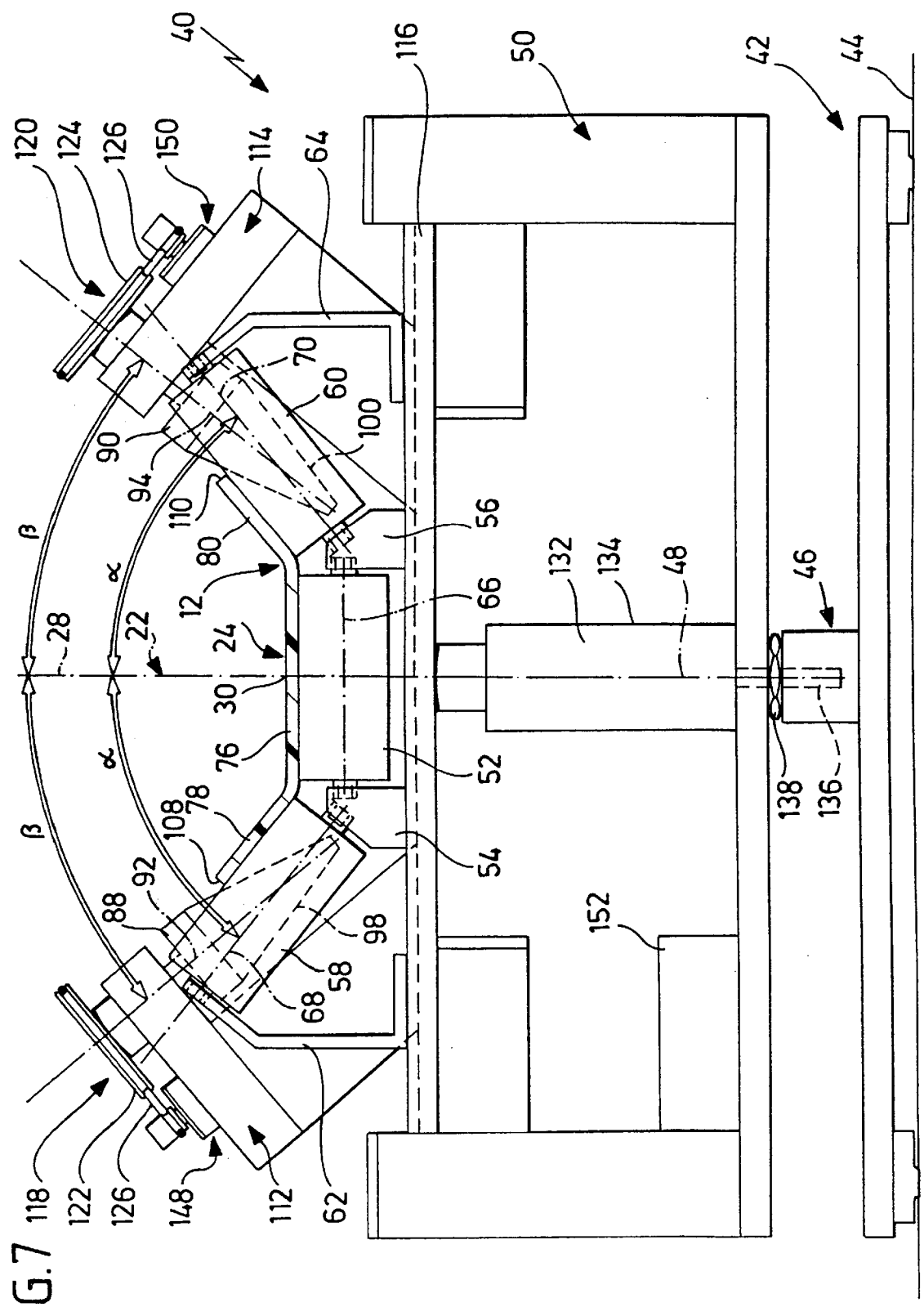
FIG. 7 shows a view similar to FIG. 2 of a variation of the first embodiment.

Proceeding from this maximum pivot position of the rotary frame 50, the inclined position of the plane 72 and thus of the support rollers 52, 58 and 60 still has the effect that the force K is acting on the conveyor belt 12 and this attempts to move the conveyor belt back into the central position. If the conveyor belt now moves back in the direction of its central position, proceeding from the maximum pivot position, the side edge 110 of the conveyor belt 12 will drive the alignment roller 90 in the maximum pivot position of the rotary frame 50 when the conveyor belt starts to shift back sideways, which is possible due to the fact that the alignment roller 90 has followed the conveyor belt 12, i.e. its side edge 110, in particular, in the direction of the plane of symmetry 28 due to the pivoting of the rotary frame 50. When the alignment roller 90 is driven—first of all in the region of the cylinder surface 100 with a small diameter— the generator 130 is first of all driven quickly via the gearing 120 and, again, supplies the adjusting motor 132 with current in such a manner that this begins to turn the rotary frame 50 back into its normal position with the angle γ increasing in the direction of arrow 142 (FIG. 6). The cylinder surface 100 is driven in the region of an ever increasing diameter and thus the rotary frame 50 is pivoted more slowly to the same degree as the conveyor belt 12 approaches its central position and so when the normal position of the rotary frame 50 is reached, in which the plane 72 extends at right angles to the plane of symmetry 28, the conveyor belt 12 has also taken up its central position again, in which the longitudinal center 30 thereof is located in the plane of symmetry 28.

This means that a lateral shifting of the conveyor belt 12 out of the central position is corrected automatically by the inventive conveyor belt support 40.

The same applies for the lateral shifting of the conveyor belt 12 in the direction of the alignment roller 90.

In the case of the basic version described above of the embodiment described above, it is assumed that in the central position the conveyor belt 12 does not yet drive the two alignment rollers 88 and 90 but begins to drive one or other of the alignment rollers 88 or 90 directly after it shifts out of the central position.

In a variation of the first embodiment, the alignment rollers 88 and 90 can, however, also be arranged such that these are already driven by the conveyor belt 12 in the central position thereof by the side edges 108 and 110, respectively. As a result of the connection of the generators 128 and 130 for supplying the adjusting motor in such a manner that these cause the adjusting motor 132 to rotate in different directions of rotation, the supply currents for the adjusting motor cancel each other out in this case and so the adjusting motor 132 maintains the normal position of the rotary frame 50 but, as soon as the conveyor belt 12 begins to shift slightly out of the central position, likewise begins to turn the rotary frame 50 since the side edge 108 or 110, in the direction of which the conveyor belt 12 shifts out of the central position, drives the alignment roller 88 or 90 located on this side and not the opposite alignment roller any more so that the generator 128 or 130 driven by this alignment roller 98 or 100 generates the current and thus drives the adjusting motor 132 in the manner described above.

As for the rest, with a direct use of the generators 128 and 130 a minimum rotational speed of these generators is required, above which these first provide any appreciable power, and so the alignment rollers 88 and 90 driven in the central position by the conveyor belt 12 can be dimensioned via the gearings 118, 120 such that in the normal position of the rotary frame 50 and central position of the conveyor belt 12 the two generators 128 and 130 are driven at a rotational speed, at which they do not supply any appreciable power.

In a further variation of the first embodiment described above, rotational speed indicators 148 and 150 are provided instead of the generators 128 and 130 and these each generate a rotational speed signal for a control means 152 which, for its part, again activates the adjusting motor 132. The control means 152 can thereby be designed such that it drives the adjusting motor 132 as a linear function of the rotational speed signal of the rotational speed indicators 148 and 150. There is, however, also the possibility of designing the control means 152 such that the signals generated by the respective rotational speed indicators 148 and 150 are linked via a separately stored characteristic field with the current provided for supplying the adjusting motor 132 so that no cogent, linear dependency need be adhered to in the case of the linking of these parameters. For example, when using such a control means operating with a stored family of characteristics it is also possible to adapt the family of characteristics variably to the respective conditions of the belt conveyor, for example the interval, at which the inventive conveyor belt supports 40 are arranged, and thus adapt the response of the adjusting motor 132 and the rotation of the rotary frame 50, in particular the pivoting rate thereof, variably.

Figure 8:
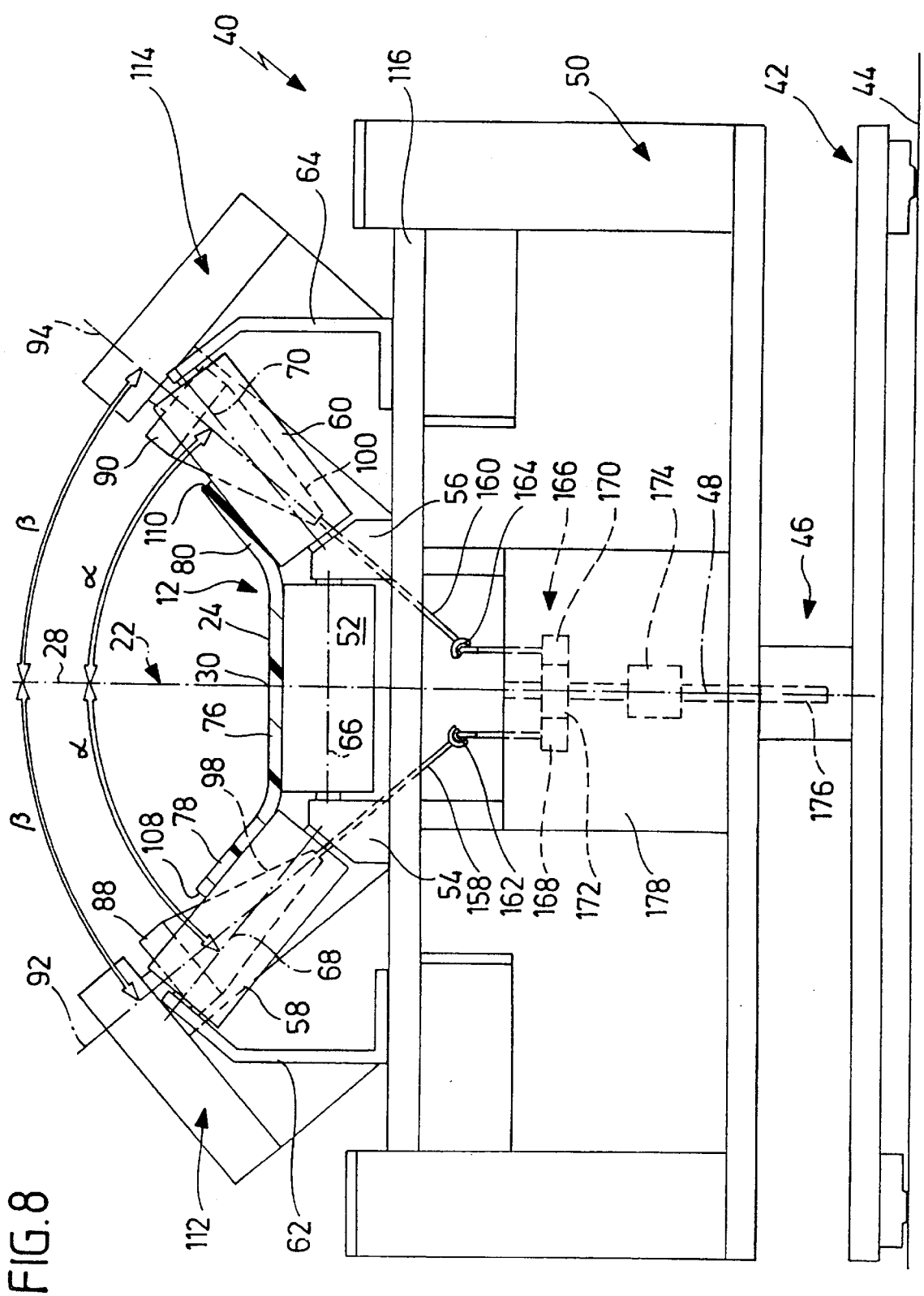
FIG. 8 shows a view similar to FIG. 2 of a second embodiment.

In a second embodiment of an inventive conveyor belt support, illustrated in FIG. 8, the alignment rollers 88 and 90 as well as the support rollers 52, 58 and 60 are arranged and mounted on the rotary frame 50 in the same way as in the first embodiment and so, in this respect, reference is made in full to the first embodiment.

However, in the second embodiment according to FIG. 8, the alignment rollers 88 and 90 mechanically drive a mechanical gearing 166 directly via drive shafts 158 and 160 as well as joints 162 and 164. This mechanical gearing is provided instead of the adjusting motor 132 and causes the rotary movement of the rotary frame 50 in relation to the base frame 42, in principle, in the same way as in the embodiments described above so that the function of the conveyor belt support is the same as in the embodiments described in the above.

For example, the mechanical gearing 166 comprises two gear wheels 168 and 170 which are driven by the shafts 158 and 160, respectively, operate on a common gear wheel 172 and, depending on which of the alignment rollers 88 and 90 is driven by the conveyor belt 12, turn the gear wheel 172 in opposite directions, wherein the gear wheel 172 drives a reduction gearing 174, the driven shaft 176 of which is rigidly connected to the base frame 42 in the same way as the motor shaft 136 while a gear housing 178 is rigidly connected to the rotary frame 50. This means that the same functions can be achieved as in the first embodiment, with the single difference that the respective alignment roller 88 or 90 not driven by the conveyor belt 12 turns in the opposite direction to the case of the drive by the conveyor belt 12 and so the alignment rollers 88 and 90 preferably have to be arranged such that these are not driven at the same time by the conveyor belt 12 in all the pivot positions and also in the normal position of the rotary frame 50 in order to avoid any slipping between at least one of the alignment rollers 88 or 90 and the conveyor belt 12.

Figure 9:
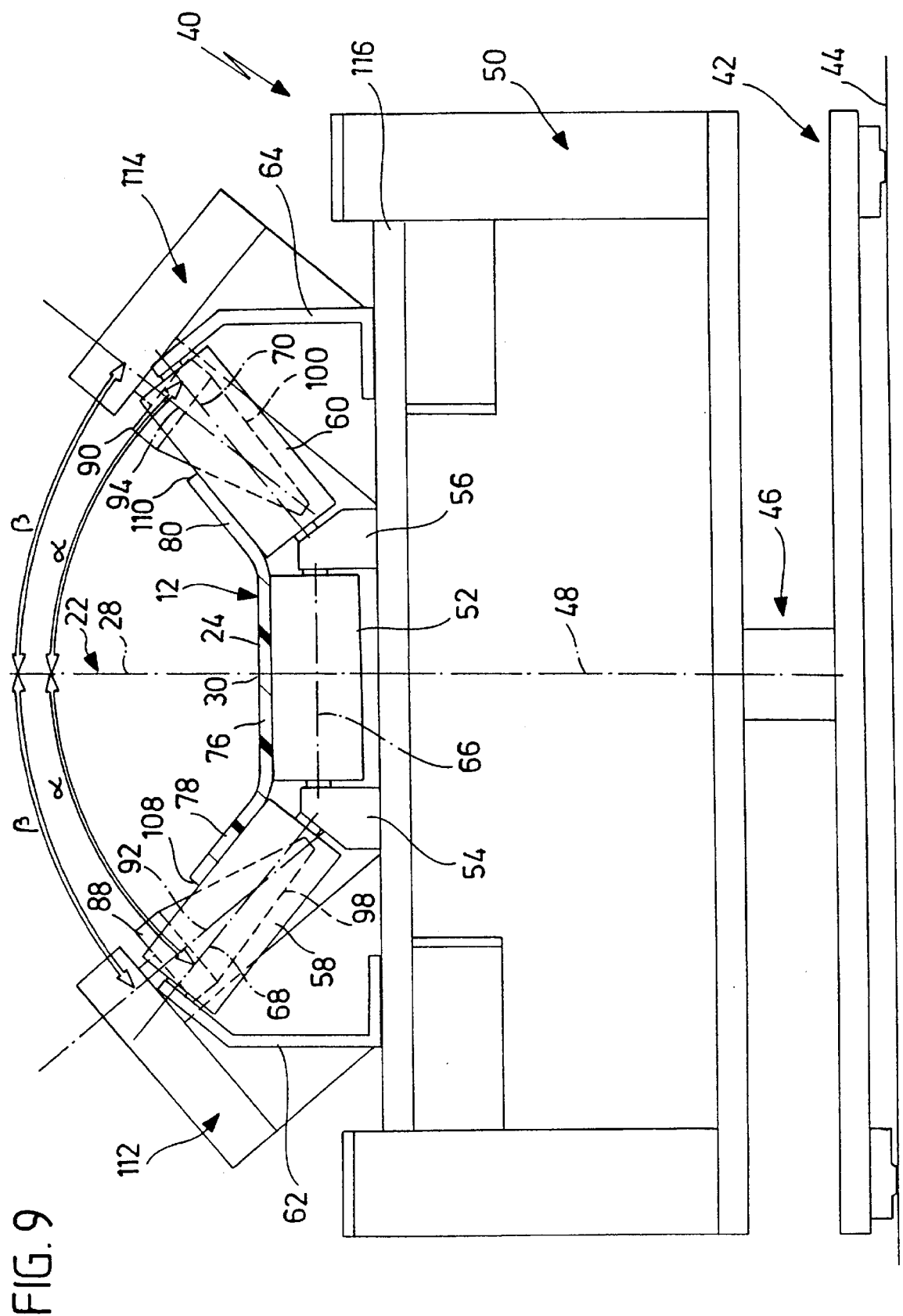
FIG. 9 shows a view similar to FIG. 2 of a third embodiment.

In a third embodiment of the inventive conveyor belt support, illustrated in FIG. 9, the rotary frame 50 as well as the mounting of the support rollers 52, 58 and 60 as well as the mounting of the alignment rollers 88 and 90 are designed in the same way as in the first embodiment.

In contrast to the first and second embodiments, however, the rotary frame 50 in the third embodiment is freely rotatable in relation to the base frame 42, wherein the pivot bearing thus merely ensures the free rotatability of the rotary frame 50. This embodiment also functions, in principle, exactly as described in conjunction with the first embodiment, wherein when the conveyor belt 12 shifts out of the central position the pivoting of the rotary frame 50 is caused by the conveyor belt 12 coming to rest with its respective side edge 108 or 110 on the alignment roller 88 or 90 associated with the corresponding side and acting on the respective alignment roller 88 or 90 with a force directed away from the plane of symmetry 28, wherein the force is intensified by the respective alignment roller 88 or 90—as also described in the case of the preceding embodiments—having the conical cylinder surface 98 and 100, respectively, so that the force is all the stronger, the more the conveyor belt 12 shifts out of the central position and acts with its respective side edge 108, 110 on areas of greater diameter of the cylinder surfaces 98, 100.

Due to the fact that the alignment rollers 88 and 90 are arranged in the plane 84, which is at a distance from the axis of rotation 48, and therefore when the angle γ becomes smaller, as illustrated in FIG. 5, the alignment roller 88, for example, keeps out of the way of the conveyor belt 12 during a pivoting of the rotary frame 50, the force acting on the alignment roller 88 in the case of the freely rotatable rotary frame likewise has the effect that the conveyor belt 12 acting on this alignment roller 88 allows the alignment roller 88 to deflect to the side, i.e. away from the plane of symmetry 28, so that, as described in conjunction with FIG. 5, the rotary frame 50 carries out a rotary movement, in which the plane 72 is tilted to such an extent that the roller axes 66, 68 and 70 of the support rollers 52, 58 and 60 lying in this plane are located such that they act with the force K on the conveyor belt 12 and move this back again in the direction of the central position.

The rotary frame 50 is rotated even with a free rotatability in relation to the base frame 42 for such a time until the side edge 108 no longer acts on the alignment roller 88 and thus the conveyor belt 12 no longer exerts any torque on the rotary frame 50 via the alignment roller 88.

As soon as the conveyor belt 12, proceeding from the maximum pivot position illustrated in FIG. 5, begins to shift back in the direction of its central position, it acts on the opposite alignment roller 90 which again exerts a torque on the freely rotatable rotary frame 50 and turns this back into its normal position.

Figure 10:
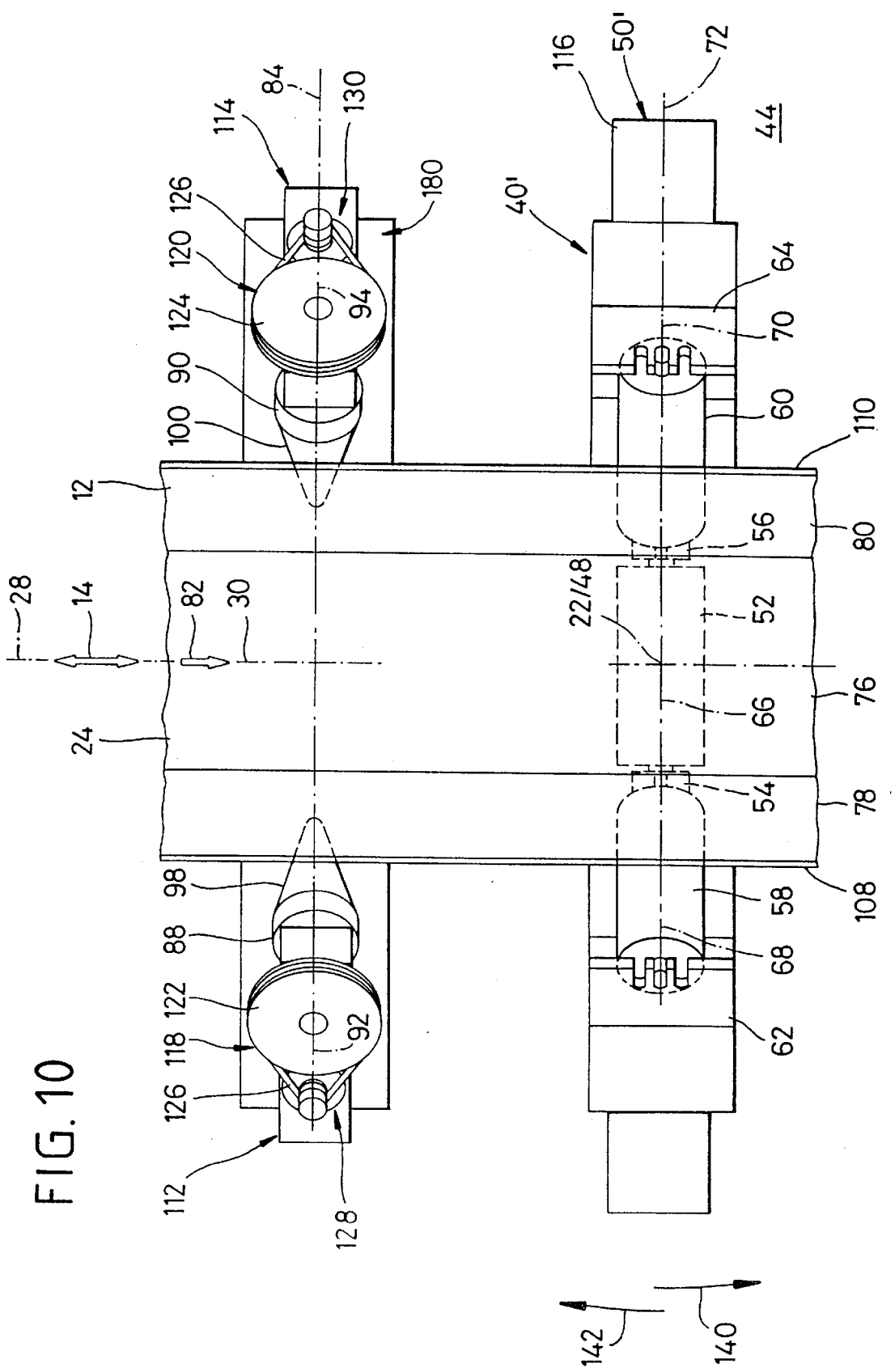
FIG. 10 shows an enlarged plan view of an inventive conveyor belt support of a fourth embodiment in a normal position.

In a fourth embodiment, illustrated in FIG. 10, the conveyor belt support 40' comprises the base frame 42 as well as the rotary frame which is designated as a whole as 50' and is mounted in a known manner on the base frame 42 via the pivot bearing 46 for rotation about the axis of rotation 48.

In contrast to the first three embodiments, only the central support roller 52 and the support rollers 58 and 60 arranged in a V shape in relation to one another on both sides of the central support roller 52 are mounted on the rotary frame 50' in the manner already described in conjunction with the first three embodiments.

With respect to the design of the base frame and the design of the rotary frame 50' insofar as the arrangement and mounting of the support rollers 52, 58 and 60 is concerned, reference is made in full to the detailed explanations concerning the first embodiment.

In contrast to the first embodiment, the alignment rollers 88 and 90 in the fourth embodiment are, however, not arranged on the rotary frame 50' but on a separate, stationary frame 180 which is immovably supported on the ground surface 44.

The bearing supports 112 and 114 for the alignment rollers 88 and 90 are also provided on the frame 180 as well as the generators 128 and 130. With respect to the mounting of the alignment rollers 88 and 90 as well as the generators 128 and 130, reference is made in full to the explanations concerning the first embodiment.

The generators 128 and 130 are connected in the same way as that described for the first embodiment so that they feed the adjusting motor 132 which leads to a pivoting of the rotary frame 50'.

In this respect, when the conveyor belt 12 shifts sideways out of its central position the alignment roller 88 or 90 respectively located on this side is driven in the same way as that described in conjunction with the first embodiment and the alignment roller then pivots the pivot frame 50' via the adjusting motor 132 in the manner already described. However, the respective alignment roller 88 or 90 is driven for as long as the conveyor belt 12 is shifting out of the central position in the direction of the respective alignment roller 88 or 90 and a pivoting back of the rotary frame 50' by means of the adjusting motor due to the oppositely located alignment roller 90 or 88 does not take place until the rotary frame 50 has caused the conveyor belt 12 to shift out of the central position in the opposite direction.

Figure 11:
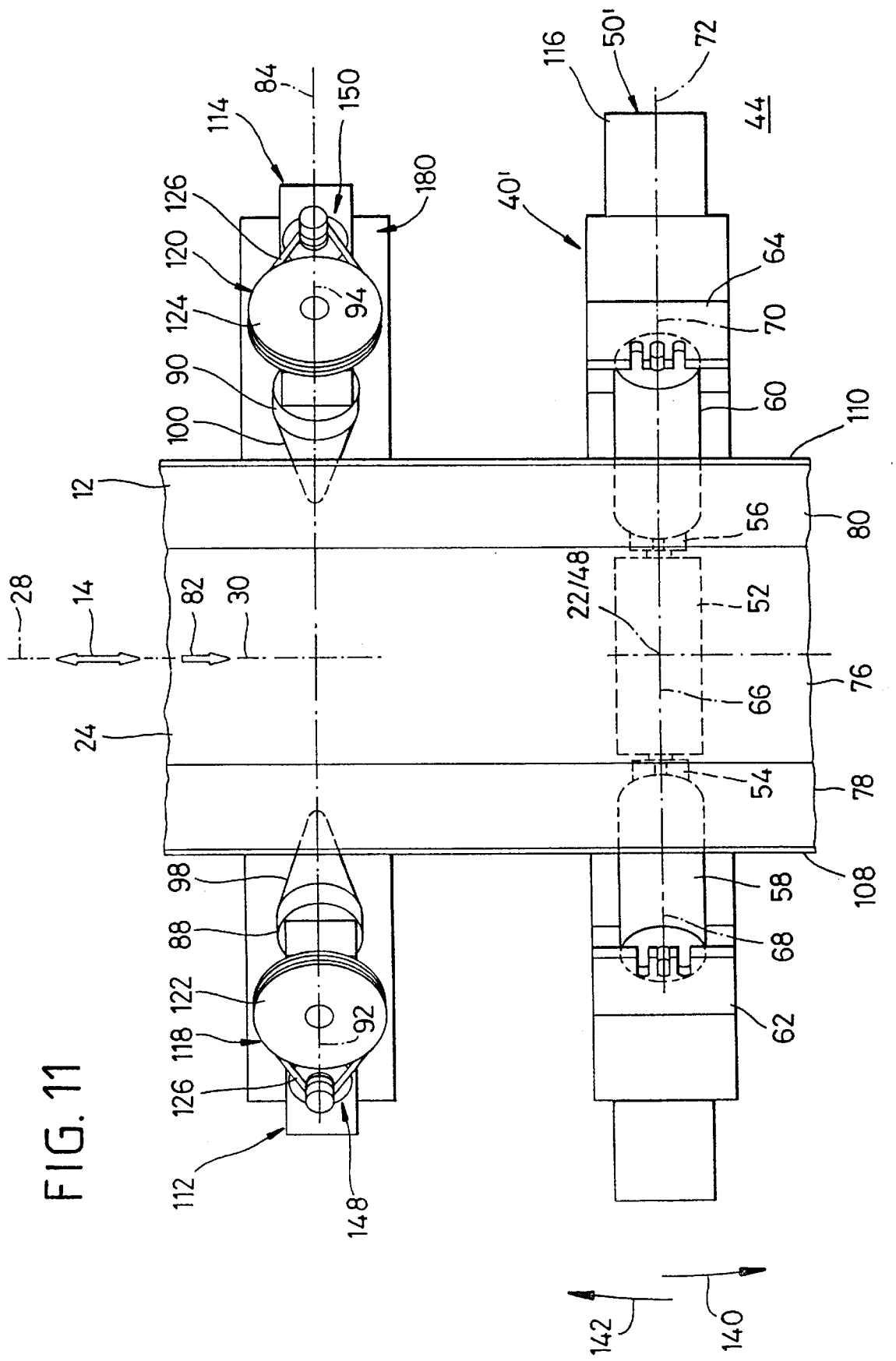
FIG. 11 shows an enlarged plan view similar to FIG. 10 of a first variation of the fourth embodiment.

For this reason, it is advantageous in the fourth embodiment when rotational speed indicators 148 and 150 (FIG. 11), which generate a rotational speed signal for the control means 152 which, for its part, then activates the adjusting motor again, are provided instead of the respective generators 128 and 130 in the same manner as in the variation of the first embodiment.

In the control means 152, current for the adjusting motor can be linked via a stored family of characteristics to the respective rotational speed of the respective rotational speed indicator and a maximum pivoting of the rotary frame 50' as well as a control hysteresis can be predetermined in order to prevent any build up of a shifting of the conveyor belt 12 in respectively opposite directions out of the central position.

The conical shape of the alignment rollers 88 and 190 can be used, in particular, to detect how far the respective side edge 108 or 110 has shifted out of the center since the abutment of the side edge at different heights of the cone leads to different rotational speeds of the respective alignment roller 88 and 90 so that even when only the one alignment roller 88 or 90 is driven by the conveyor belt 12, the control means can detect whether the side edge 108 or 110 of the conveyor belt 12 is still moving out of the central position or towards the central position again and so a pivoting back of the rotary frame 50' in the direction 142 can already be initiated via a family of characteristics when the respective side edge 108 or 110 is again moving towards the central position and so an overswinging, i.e. a shifting out of the central position in the opposite direction, can be avoided to a great extent.

Figure 12:
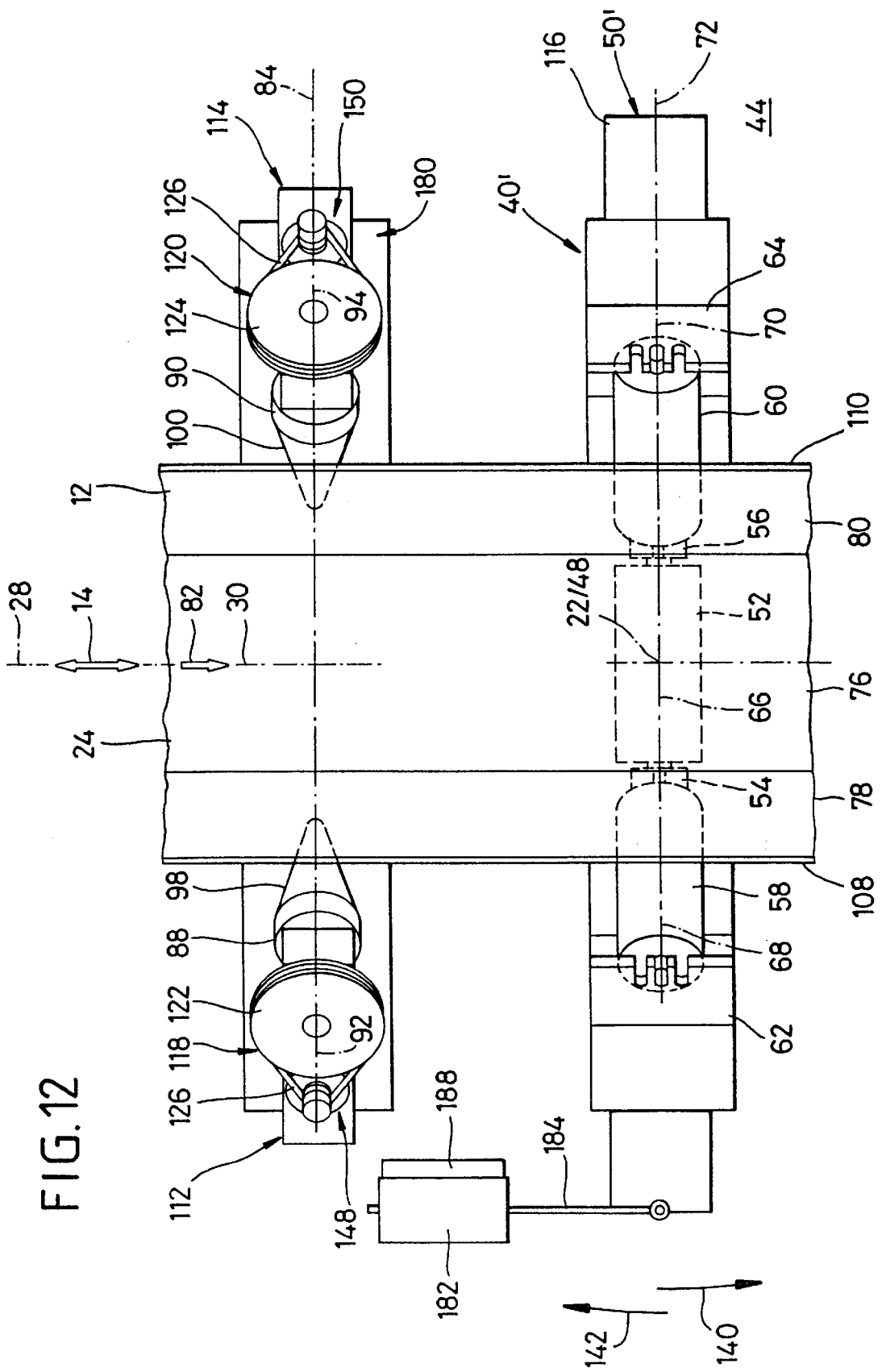
FIG. 12 shows an enlarged plan view similar to FIG. 10 of a second variation of the fourth embodiment.

In a second variation of the fourth embodiment, a push rod drive 182, which engages on the base support 116 by means of a push rod 184 via a joint 186 in order to pivot the rotary frame 50' about the axis of rotation 48, is provided instead of the adjusting motor 132, as illustrated in FIG. 12. In this respect, the push rod drive 182 is mounted on a drive support 188 arranged stationarily on the ground surface 44.

As for the rest, reference is made to the preceding explanations concerning the fourth embodiment with respect to the remaining, unaltered features.

Figure 13:
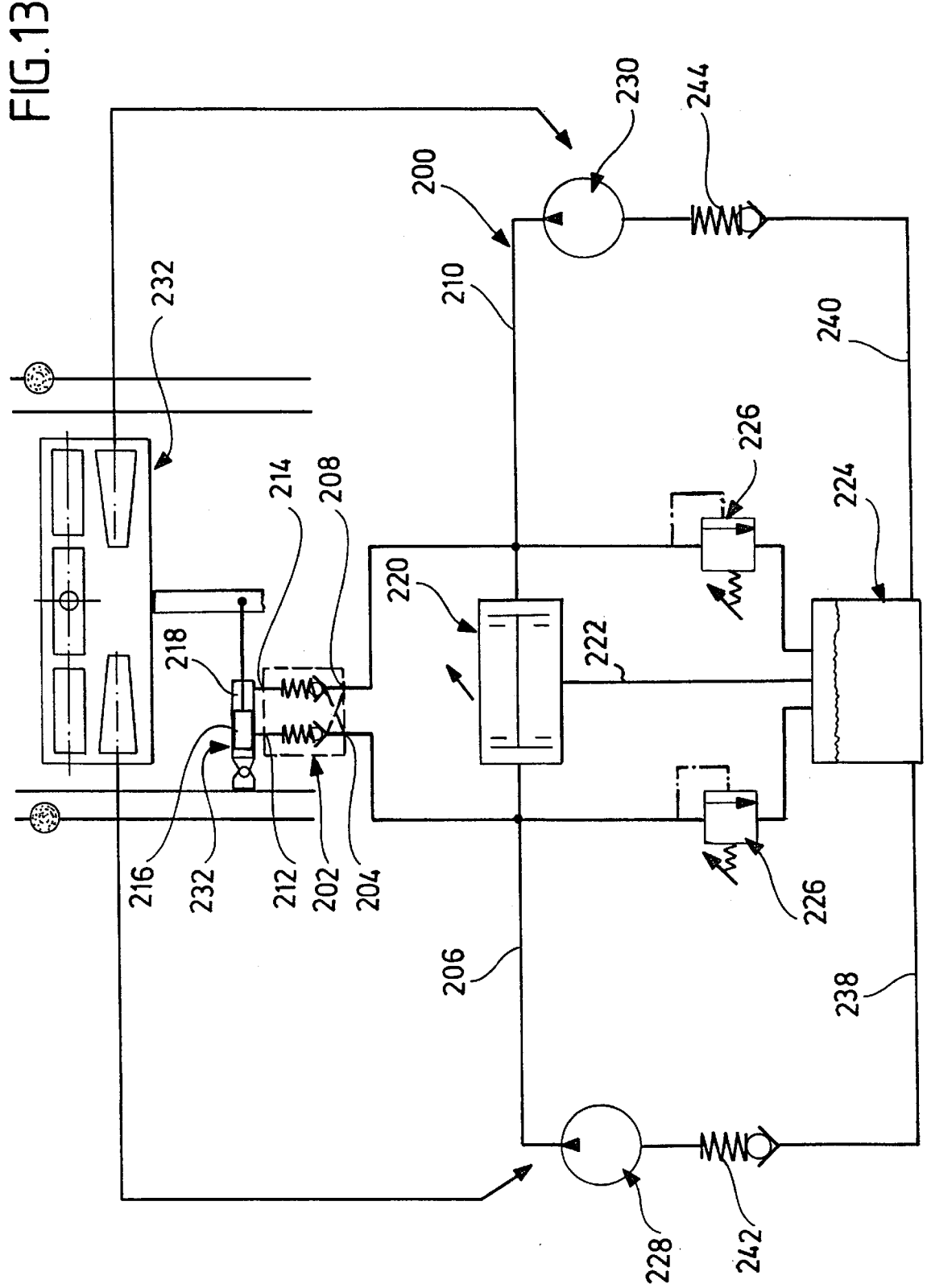
FIG. 13 shows a schematic illustration of a fifth embodiment based on a rotary frame designed in accordance with the first embodiment.

In a fifth embodiment, illustrated in FIG. 13, the rotary frame 50 is designed in the same way as described in conjunction with the first embodiment, with the difference that hydraulic pumps 228 and 230 driven by the alignment rollers 88 and 90, respectively, are provided instead of the generators 128 and 130.

When the respective alignment roller 88 or 90 is driven, the hydraulic pumps 228 and 230 forming part of a hydraulic system 200 convey a hydraulic medium, with which a hydraulic adjusting member 232, for example a hydraulic cylinder, can be actuated which then, for its part, turns the rotary frame 50 relative to the base frame 42.

The hydraulic system illustrated in FIG. 13 comprises, apart from the hydraulic pumps 228 and 230, a first pressure line 206 leading from the hydraulic pump 228 to a first connection 204 of a pilot controlled double check valve as well as a second pressure line 210 leading to a second pressure connection 208. The pilot controlled double check valve 202 has, in addition, a first output 212 and a second output 214 which are connected to a first pressure chamber 216 and a second pressure chamber 218, respectively, of the hydraulic cylinder 232.

The pilot controlled double check valve 202 operates such that when no pressure is applied to one of the inputs 204 and 208, a return flow from the outputs 212 and 214 to the respective input 204 and 208 is prevented and so hydraulic medium can also not flow out of the cylinder chambers 214 or 218 and thus, in the case of pressureless inputs 204 and 208 of the pilot controlled double check valve 202, the hydraulic cylinder 232 remains in the position, into which it was last brought by a pressure at one of the inputs 204 or 208 of the pilot controlled double check valve 202.

As soon as a pressure is present at one of the inputs 204 or 208 as a result of either the driven hydraulic pump 228 or 230, the connection not only between the first input 204 and the first output 212 but also between the second input 208 and the second output 214 is free so that hydraulic medium can flow into one of the cylinder chambers 216 or 218 and flow out of the other cylinder chamber 218 or 216.

Depending on which of the hydraulic pumps 228 or 230 is driven, the pilot controlled double check valve 202 is acted upon via the pressure lines 206 or 210 and thus the hydraulic cylinder 232 is displaced.

In order to ensure that only one of the hydraulic pumps 228 or 230 acts on the pilot controlled double check valve 202 each time, a two-pressure valve designated as a whole as 220 is connected between the two pressure lines 206 and 212. This valve 220 is connected to a hydraulic tank 224 via a return line 222 and respectively connects that one of the pressure lines 206 or 210 via the return line 222 to the hydraulic tank 224, in which the lower pressure prevails, while the respectively other one of the pressure lines 210 or 206 remains unaffected.

In order, in addition, to determine a maximum pressure in the two pressure lines 206 or 210, each of these pressure lines is connected to the hydraulic tank 224 via a respective pressure limiting device 226.

In addition, each of the hydraulic pumps 228 or 230 draws in hydraulic medium from the hydraulic tank 224 via a suction line 238 or 240 and a check valve 242 or 244 arranged therein.

As a result of the solution according to the fifth embodiment, illustrated in FIG. 13, is it thus possible to realize thesame functions, which have been described in detail in conjunction with the first embodiment, via the hydraulic system 200 by means of the hydraulic pumps 228 and 230 and the hydraulic cylinder 232, as well.

With respect to all the functions of the fifth embodiment, reference is therefore made in full to the explanations concerning the first embodiment.

Figure 14:
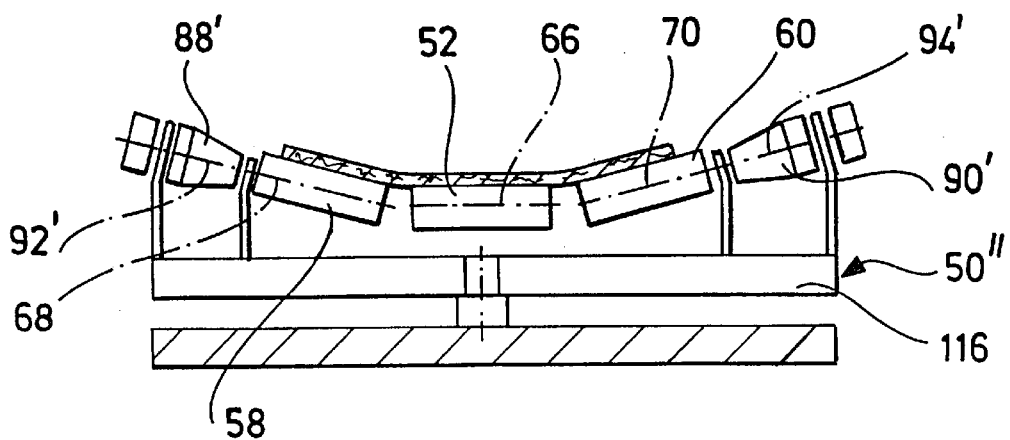
FIG. 14 shows a view similar to FIG. 2 of a sixth embodiment.
Figure 15:
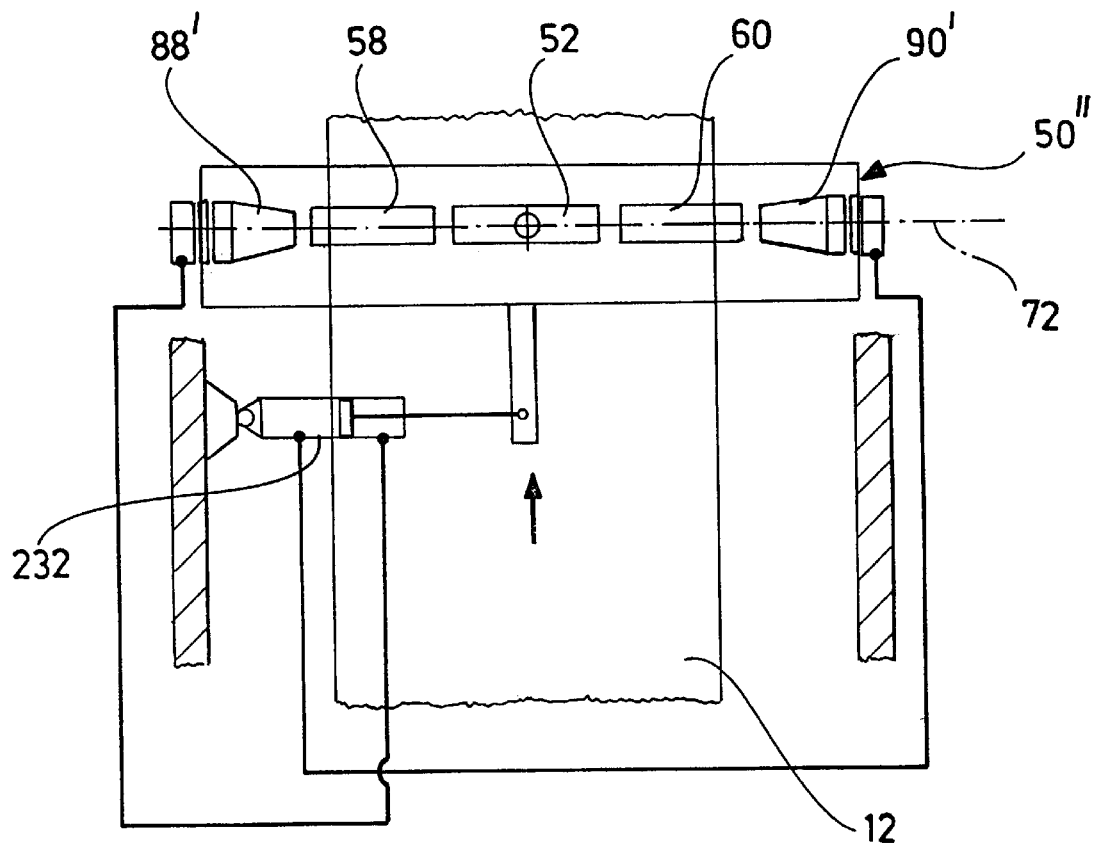
FIG. 15 shows a view similar to FIG. 3 of the sixth embodiment.
Figure 16:
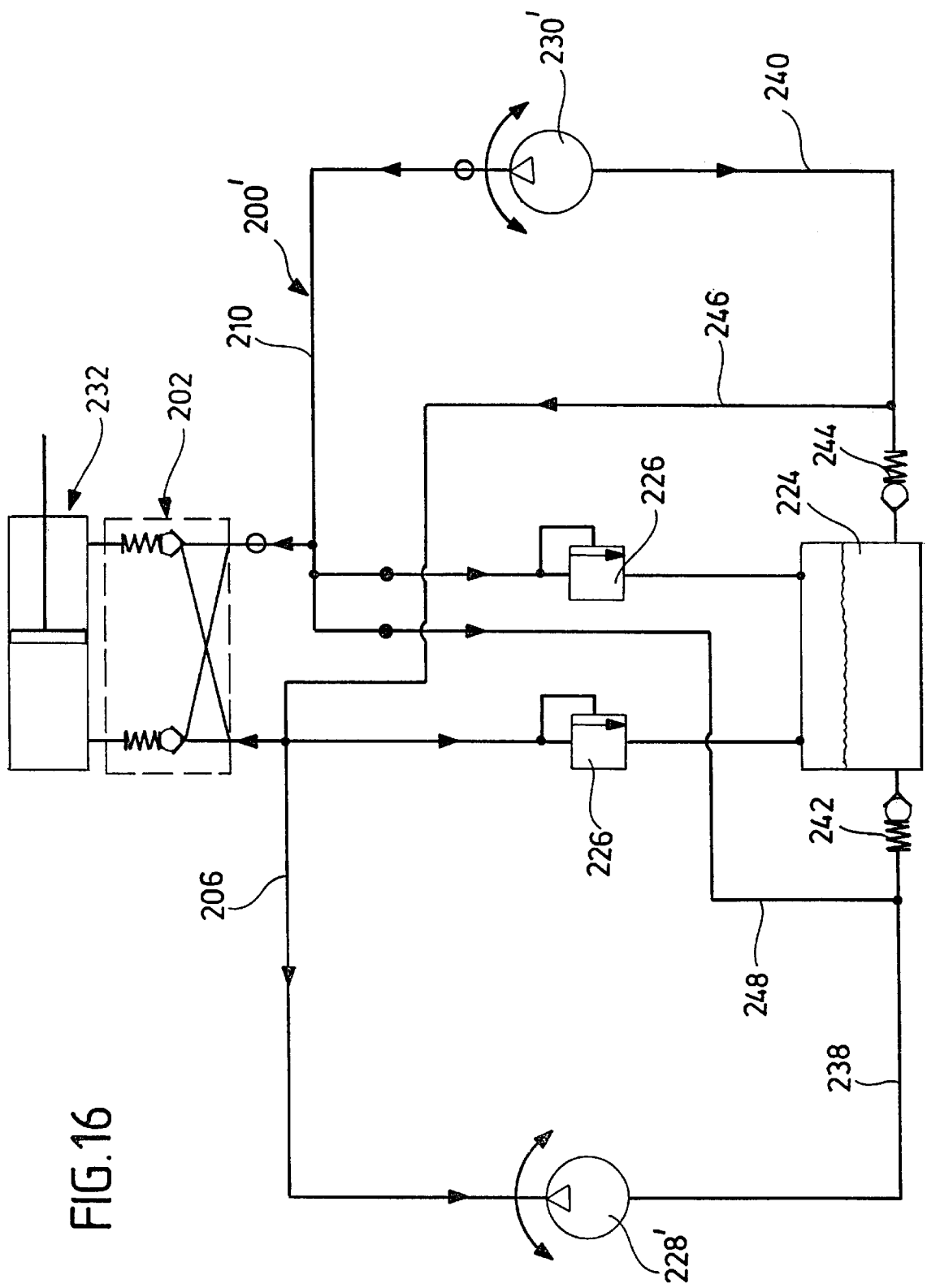
FIG. 16 shows a schematic illustration of a hydraulic system for a first variation of the sixth embodiment.

In a seventh embodiment, illustrated in FIGS. 14 and 15, the rotary frame 50" is of an identical design to the first embodiment with respect to the arrangement of the support rollers 52, 58 and 60.

In contrast to the first embodiment, the alignment rollers 88' and 90' are not located in a plane 84 parallel to the plane 72 of the support rollers 52, 58, 60 but in the plane 72, and namely such that their axes of rotation 92' and 94' are preferably aligned with the roller axes 68 and 70, respectively, or are inclined in relation to the horizontal to an even greater extent than them.

Each of the alignment rollers 88' and 90' drives, for its part, a hydraulic pump 238' and 230', respectively, of a hydraulic system which is designated as a whole as 200' and, basically, is constructed in an identical manner to the hydraulic system 200, with the difference that the hydraulic pumps 228' and 230' can be driven in directions of rotation opposite to one another and the hydraulic system 200' functions independently of the running direction of the conveyor belt 12.

In order to ensure the functioning of the hydraulic system irrespective of the drive direction of rotation of the conveyor pumps 228' and 230', a first transverse line 246, which opens into the first pressure line 206, branches off from the second suction line 240 between the check valve 244 and the hydraulic pump 230' in the case of the hydraulic system 200'.

In same way, a second transverse line 248, which opens into the second pressure line 210, branches off from the first suction line 238 between the check valve 242 and the hydraulic pump 228'.

If one of the pumps 228' or 230' is now driven in reverse direction, i.e. such that this conveys hydraulic medium into its suction line 238 or 240, the respective transverse line 248 or 246 leads to a pressure being built up in the pressure line 210 or 206 of the respectively other hydraulic pump 230' or 228' while hydraulic medium is drawn in via the respectively other transverse line 246 or 248 from the suction line 240 or 238 of the respectively other hydraulic pump 230' or 228' via the respective check valve 244 or 242.

In the case of the reverse drive direction of, for example, the hydraulic pump 228', this leads to a pressure being applied at the input 214 of the pilot controlled double check valve 202 or a pressure at the input 212 when the hydraulic pump 230' is driven in reverse direction.

Figure 17:
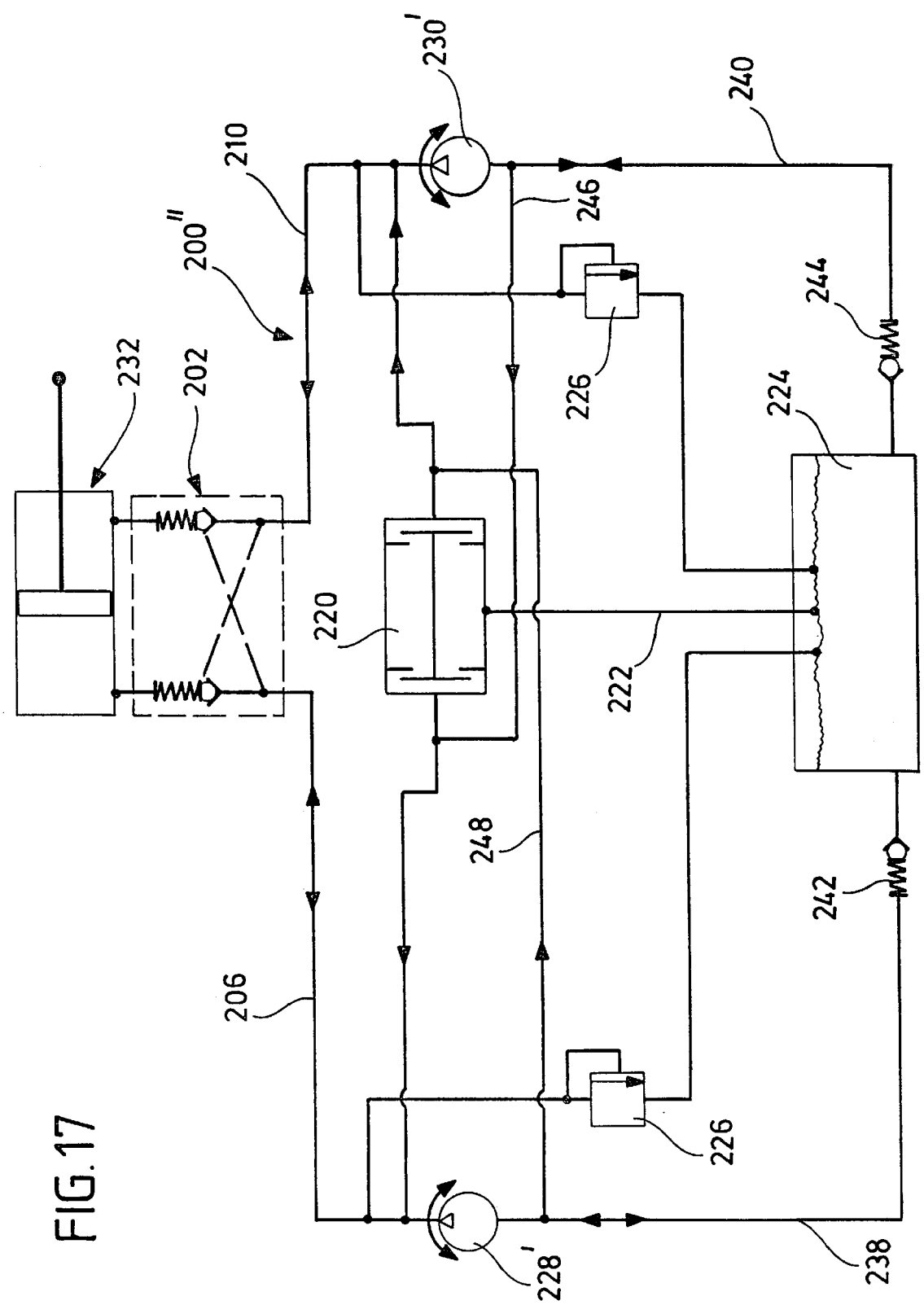
FIG. 17 shows a schematic illustration of a second variation of a hydraulic system for the sixth embodiment.

In addition, the hydraulic system 200' can, as illustrated in FIG. 17, be provided with a two-pressure valve 220 connected between the pressure lines 206 and 210, as illustrated in FIG. 17 in the hydraulic system 200", wherein the two-pressure valve 220 functions in the same way as that described in conjunction with the fifth embodiment in the hydraulic system 200 (FIG. 13).

As for the rest, the hydraulic system 200", illustrated in FIG. 17, is designed in the same way as the hydraulic system 200' and likewise also functional when the drive direction of the hydraulic pumps 228' and 230' is reversed.

The first six embodiments of an inventive conveyor belt support 40 pertain primarily to the guidance of a conveying run of the conveyor belt 12. A seventh embodiment of an inventive conveyor belt support 40', illustrated in FIGS. 18 and 19, has as its object the guidance of a return run of the conveyor belt.

Since the return run of the conveyor belt 12 does not transport any loads and, in particular, any loose products, it is sufficient to guide the return run of the conveyor belt 12 on a single support roller, namely the central support roller 52', wherein the central support roller 52' turns about a roller axis 66' extending essentially horizontal and extends along its axis 66' over the entire width of the return run of the conveyor belt 12.

The alignment rollers 88 and 90 are arranged with their axes of rotation 92 and 94 in the plane 84 which is located parallel to the plane 72, in which the roller axis 66' extends.

The axes of rotation 92 and 94 can, in this case, be inclined in the same way as in the first embodiment or extend parallel to the roller axis 66'.

Not only the alignment rollers 88 and 90 but also the central support roller 52' are arranged together on a rotary frame 50''' which is, in principle, arranged on a base frame 42 as in the first embodiment in the same manner as that described in the case of the first embodiment. With respect to the arrangement of the rotary frame 50 on the base frame 42 as well as the entire functioning as a result of the rotary movement of the rotary frame 50''' in relation to the base frame 42, reference is made in full to the explanations concerning the first embodiment.

Figure 19:
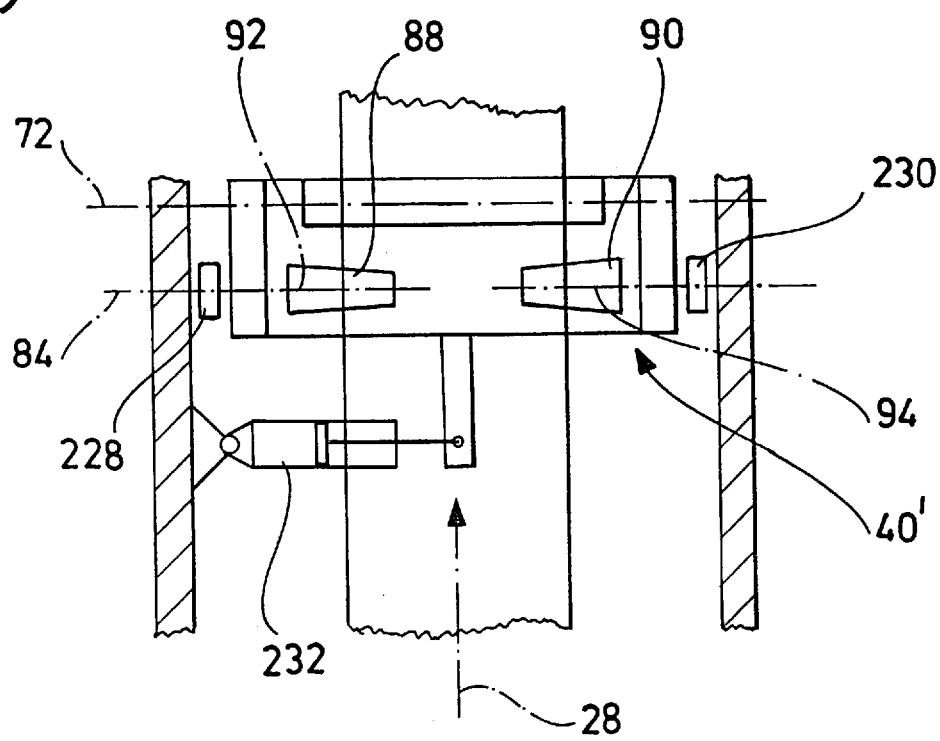
FIG. 19 shows a view similar to FIG. 3 of the seventh embodiment.

The rotary movement of the rotary frame 50''' is brought about by a hydraulic cylinder 232, as illustrated in FIG. 19 by way of example, wherein this is part of a hydraulic system 200 which is described in detail in conjunction with the fifth embodiment and comprises hydraulic pumps 228 and 230 which can be respectively driven by the alignment rollers 88 and 90. With respect to the design of the hydraulic system 200 for driving the hydraulic cylinder 232, reference is made in full to the fifth embodiment.

Figure 18:
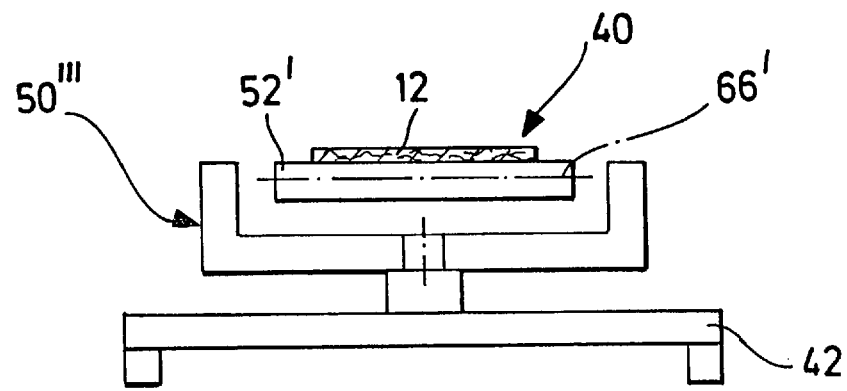
FIG. 18 shows a view similar to FIG. 2 of a seventh embodiment.

In a further modification of the seventh embodiment, illustrated in FIGS. 18 and 19, it is likewise possible to displace the alignment rollers 88 and 90 likewise into the plane 72 and to modify the hydraulic system 200 in accordance with the hydraulic system 200' or 200" so that the functions described in conjunction with the first embodiment can also be realized for guiding the return run symmetrically to the plane of symmetry 28 even for different running directions of the return run.

What is claimed is:

1. A conveyor belt support for a belt conveyor, comprising:

a frame comprising a base frame and a rotary frame pivotable about an axis of rotation in relation to the base frame;

at least one support roller for a conveyor belt of the belt conveyor;

said roller being arranged on the frame and extending with its roller axis transversely to a longitudinal direction of the conveyor belt;

an underside of the conveyor belt resting on said roller;

said rotary frame supporting the support roller;

alignment rollers, which are provided in addition to the support roller for holding the conveyor belt in a central position of the belt conveyor;

said alignment rollers being arranged such that the conveyor belt running on the support roller acts an at least one of the alignment rollers when shifting sideways out of the central position; and a hydraulic system, comprising:

two hydraulic pumps, each adapted to be driven by an associated one of said alignment rollers, and each being adapted to take in a hydraulic medium through a suction line associated therewith, and to feed the hydraulic medium to a pressure line associated therewith;

a hydraulic drive for pivoting said rotary frame in relation to the base frame, and being connected to said pressure lines associated with said hydraulic pumps;

a two-pressure valve located between said two pressure lines which are leading from said respective hydraulic pumps to said hydraulic drive;

said two-pressure valve connecting the pressure line with the lower pressure to a hydraulic reservoir via a return line, while allowing the hydraulic medium in the pressure line with the greater pressure to be provided to the hydraulic drive; and said hydraulic drive pivoting said rotary frame with the support roller into a rotary position in which the support roller guides the conveyor belt in the direction of the central position, in response to the action of said conveyor belt on said at least one of the alignment rollers, and according to the pressure line with the greater pressure.

2. A conveyor belt support as defined in claim 1, wherein:

the conveyor belt support is provided after five to fifty conveyor belt supports with roller axes arranged rigidly in relation to the base frame.

3. A conveyor belt support as defined in claim 1, wherein:

said two pressure lines lead directly from said respective hydraulic pumps to said hydraulic drive; and each of said pressure lines fluidly communicates with said two-pressure valve such that the hydraulic medium from the pressure line with the lower pressure is drawn through said two-pressure valve to the hydraulic reservoir via the return line, while the hydraulic medium in the pressure line with the greater pressure bypasses said two-pressure valve and is provided directly from the corresponding hydraulic pump to the hydraulic drive.

4. A conveyor belt support as defined in claim 1, wherein the alignment rollers have a rotationally symmetric outer casing with a diameter varying in an axial direction.

5. A conveyor belt support as defined in claim 4, wherein the outer casing is a cone-shaped casing.

6. A conveyor belt support as defined in claim 4, wherein the alignment rollers are arranged such that areas of the outer casing with the smallest diameter face one another.

7. A conveyor belt support as defined in claim 4, wherein the alignment rollers are arranged such that areas of the outer casing with the greatest diameter are located remote from one another.

8. A conveyor belt support as defined in claim 4, wherein the alignment rollers are arranged such that their outer casings, when viewed transversely to the direction of conveyance, project beyond a contact surface for the conveyor belt defined by the support roller upwardly in the direction of the conveyor belt on both sides of the conveyor belt running in said central position.

9. A conveyor belt support as defined in claim 8, wherein the alignment rollers are arranged with their axes of rotation in a V shape in relation to one another.

10. A conveyor belt support as defined in claim 9, wherein the alignment rollers form a smaller angle between them with their axes of rotation than lateral regions of the contact surface defined by the support roller, on which the conveyor belt rests in said central position.

11. A conveyor belt support as defined in claim 1, wherein the alignment rollers are located with their axes of rotation in one plane together with the roller axis of the support roller.

12. A conveyor belt support as defined in claim 11, wherein the alignment rollers are arranged on both sides of the at least one support roller.

13. A conveyor belt support as defined in claim 12, wherein the alignment rollers are arranged to adjoin outer ends of the at least one support roller.

14. A conveyor belt support as defined in claim 1, wherein the alignment rollers are arranged with their axes of rotation in a plane arranged at a distance to the plane of the roller axis of the support roller.

15. A conveyor belt support as defined in claim 1, wherein the alignment rollers, when seen in the direction of conveyance, are arranged in front of the support roller.

16. A conveyor belt support as defined in claim 1, wherein the alignment rollers are arranged to be movable transversely to the direction of conveyance towards or away from the conveyor belt.

17. A conveyor belt support as defined in claim 16, wherein with the pivoting of the rotary frame into a pivot position for guiding the conveyor belt back into the central position, a movement of the alignment roller driven during the shifting of the conveyor belt out of the central position takes place transversely to the direction of conveyance in a direction away from the conveyor belt.

18. A conveyor belt support as defined in claim 17, wherein in a maximum pivot position of the rotary frame, the alignment roller first driven when the conveyor belt shifts out of the central position is no longer acted upon by the conveyor belt.

19. A conveyor belt support as defined claim 15, wherein during the pivoting of the rotary frame into a pivot position for guiding the conveyor belt back into the central position, a movement of the alignment roller located opposite the side where the conveyor belt shifts outwardly takes place transversely to the direction of conveyance in the direction towards the conveyor belt.

20. A conveyor belt support as defined in claim 19, wherein the alignment roller located opposite the side where the conveyor belt shifts out of the central position is movable transversely to the direction of conveyance to such an extent that it is driven by the conveyor belt in a maximum pivot position of the rotary frame.

21. A conveyor belt support as defined in claim 19, wherein the alignment roller located opposite the side of the shifting out of the central position is driven during the pivoting of the rotary frame back into a normal position until the rotary frame reaches its normal position.

22. A conveyor belt support as defined in claim 1, wherein in a normal position of the rotary frame and said central position of the conveyor belt, neither of the alignment rollers is driven.

23. A conveyor belt support as defined in claim 1, wherein the alignment rollers are movable transversely to the direction of conveyance in response to the pivoting movement of the rotary frame.

24. A conveyor belt support as defined in claim 1, wherein the two alignment rollers are movable together transversely to the direction of conveyance.

25. A conveyor belt support as defined in claim 1, wherein the two alignment rollers are arranged on the rotary frame.

26. A conveyor belt support as defined in claim 1, wherein the alignment rollers are arranged to be stationary relative to the base frame.

27. A conveyor belt support as defined in claim 16, wherein the alignment rollers are located with their axes of rotation in a plane arranged at a distance from the axis of rotation.

28. A conveyor belt support as defined in claim 27, wherein the plane extends parallel to the axis of rotation.

29. A conveyor belt support as defined in claim 1, wherein the hydraulic pumps are functional during driving in two directions of rotation opposite to one another.

30. A conveyor belt support as defined in claim 1, wherein the hydraulic system comprises a pilot controlled double check valve connected to the input to the hydraulic drive.

31. A conveyor belt support as defined in claim 1, wherein the hydraulic system comprises a two-pressure valve located between two pressure lines leading to the hydraulic drive, said valve connecting the pressure line with the lower pressure to a hydraulic tank via a return line.

32. A conveyor belt support for a belt conveyor, comprising:
a frame comprising a base frame and a rotary frame pivotable about an axis of rotation in relation to the base frame;
at least one support roller for a conveyor belt of the belt conveyor;
said roller being arranged on the frame and extending with its roller axis transversely to a longitudinal direction of the conveyor belt;
an underside of the conveyor belt resting on said roller;
said rotary frame supporting the support roller;
alignment rollers, which are provided in addition to the support roller for holding the conveyor belt in a central position of the belt conveyor;
said alignment rollers being arranged such that the conveyor belt running on the support roller acts on at least one of the alignment rollers when shifting sideways out of the central position;
each alignment roller adapted to drive a generator for generating a supply current in proportion to a rotational speed thereof;
an adjusting drive receiving the supply current of said at least one of said generators;
one of said supply currents adapted to drive said adjusting drive in the opposite direction than the other supply current;
said adjusting drive being adapted to pivot said rotary frame with said support roller with respect to said base frame into a rotary position in which the support roller guides the conveyor belt in the direction of the central position, according to the one of said supply currents.

33. A conveyor belt support as defined in claim 32, wherein:
the conveyor belt support is provided after five to fifty conveyor belt supports with roller axes arranged rigidly in relation to the base frame.

34. A belt conveyor as defined in claim 33, wherein one of said conveyor belt supports is arranged after approximately ten to approximately thirty conventional conveyor belt supports with roller axes arranged rigidly in relation to the base frame.

35. A conveyor belt support as defined in claim 32, wherein:

the alignment rollers have a rotationally symmetric outer casing with a diameter varying in an axial direction.

36. A conveyor belt support for a belt conveyor, comprising:

a frame comprising a base frame and a rotary frame pivotable about an axis of rotation in relation to the base frame;

at least one support roller for a conveyor belt of the belt conveyor;

said roller being arranged on the frame and extending with its roller axis transversely to a longitudinal direction of the conveyor belt;

an underside of the conveyor belt resting on said roller;

said rotary frame supporting the support roller;

alignment rollers, which are provided in addition to the support roller for holding the conveyor belt in a central position of the belt conveyor;

said alignment rollers being arranged such that the conveyor belt running on the support roller acts on at least one of the alignment rollers when shifting sideways out of the central position;

each alignment roller adapted to drive a sensor for supplying a signal dependent on the rotational speed thereof;

a controller for receiving said signals from said sensors and generating an appropriate supply current;

an adjusting drive for receiving said supply current;

said adjusting drive being adapted to pivot said rotary frame with said support roller with respect to said base frame into a rotary position in which the support roller guides the conveyor belt in the direction of the central position, according to said appropriate supply current.

37. A conveyor belt support as defined in claim 36, wherein:

said controller links said signals of said sensors to said appropriate supply current for said adjusting drive via a stored characteristic field.

38. A conveyor belt support as defined in claim 36, wherein:

the alignment rollers have a rotationally symmetric outer casing with a diameter varying in an axial direction.

39. A conveyor belt support as defined in claim 36, wherein:

the conveyor belt support is provided after five to fifty conveyor belt supports with roller axes arranged rigidly in relation to the base frame.

\* \* \* \* \*